United States Patent [19]

Kobayashi et al.

[11] Patent Number: 4,589,607
[45] Date of Patent: May 20, 1986

[54] MAGNETIC RECORDING TAPE DRIVING APPARATUS

[75] Inventors: Minoru Kobayashi; Sinichi Saitou; Goro Kitajima, all of Tokyo, Japan

[73] Assignee: Olympus Optical Co., Ltd., Tokyo, Japan

[21] Appl. No.: 692,768

[22] Filed: Jan. 18, 1985

[30] Foreign Application Priority Data

Jan. 31, 1984 [JP] Japan .................................. 59-15330

[51] Int. Cl.⁴ .............................................. G11B 15/00
[52] U.S. Cl. ...................................... 242/180; 360/91; 360/104
[58] Field of Search ................ 242/180, 200, 206–210; 360/96.1–96.5, 104, 105, 91, 92, 17

[56] References Cited

U.S. PATENT DOCUMENTS 3,777,075 12/1973 Hendershot, III et al. .... 242/180 X
4,445,000 4/1984 Hashimoto ............................ 360/17

FOREIGN PATENT DOCUMENTS 88183 12/1966 France ................................ 242/180
53-73809 6/1978 Japan .

Primary Examiner—Stuart S. Levy
Assistant Examiner—David Werner
Attorney, Agent, or Firm—Frishauf, Holtz, Goodman & Woodward

[57] ABSTRACT

A magnetic recording tape driving apparatus comprises a motor, two pairs of reel shafts on which a pair of reel hubs of each of two cassette tapes are mounted, two capstans for the two cassette tapes, a head base plate supporting two magnetic heads and two pinch rollers each provided in a position corresponding to each pair of the reel shafts and movable between a first position, at which the magnetic heads and the pinch roller are all spaced apart from the magnetic tapes accommodated in the respective paired cassette tapes with the reel hubs thereof mounted on the two pairs of reel shafts, and a second position, at which the magnetic heads and the pinch rollers are all in contact with the magnetic tapes accommodated in the paired cassette tapes, and a gear train for selectively transmitting rotational power from the motor to the two capstans and the two pairs of reel shafts.

4 Claims, 17 Drawing Figures

MAGNETIC RECORDING TAPE DRIVING APPARATUS

BACKGROUND OF THE INVENTION

This invention relates to a magnetic recording tape driving apparatus and, more particularly, to a magnetic recording tape driving apparatus, which has two pairs of reel shafts with each pair of reel shafts driving a magnetic recording tape in a cassette tape.

The magnetic recording tape driving apparatus noted above is well known in the art, as disclosed in Japanese Utility Model Disclosure No. 53-73809.

In the magnetic recording tape driving apparatus disclosed, two head base plates are provided for respective pairs of reel shafts, each head base plate carrying a magnetic head and a pinch roller. The two head base plates are operated independently in correspondence to various modes of the magnetic recording tape driving apparatus. With this construction, an operating means for operating the two head base plates independently is complicated in construction, leading to a complicated construction of the overall apparatus and hence to increase of the costs of manufacture and assembly and increase of the size of the apparatus.

Further, in the prior art magnetic recording tape driving apparatus disclosed, the two pairs of reel shafts are driven by a single motor as a power generating means. This structure, unlike the case where two separate rotational power generating means are employed for driving the two pairs of reel shafts, can be free from a rotational power transmission mechanism for transmitting rotational power from one rotational power generating means to one of the two pairs of reel shafts as well as that rotational power generating means, so that the construction of the apparatus can be simplified, leading to reduction of the costs of manufacture and assembly and also to reduction of the size of the apparatus. However, in the prior art apparatus noted above belts are employed for the transmission of rotational power from the motor to two pair of reel shafts. The belts are liable to become loose or be excessively stretched with temperature changes, leading to slip or excessive friction. In such cases, it will become impossible to obtain accurate transmission of the rotational power and drive the mangnetic recording tapes in the two cassette tapes at a predetermined speed.

SUMMARY OF THE INVENTION

The invention has been intended in the light of the above affairs, and a first object of the invention is to provide a magnetic recording tape driving apparatus of the type noted above, which permits simplification of the construction of an operating means for operating a head base plate according to its various modes, thus permitting reduction of the costs of manufacture and assembly and reduction of the size of the apparatus.

The first object of the invention is attained by the provision of a magnetic tape driving apparatus comprising:

a rotational power generating means;

two pairs of reel shafts, on which a pair of reel hubs of each of a pair of cassette tapes are mounted;

two capstans each provided in a position corresponding to each pair of the steel shafts;

a head base plate supporting two magnetic heads and two pinch rollers each provided in a position corresponding to each pair of the reel shafts and movable between a first position, at which the magnetic heads and the pinch rollers are all spaced apart from the magnetic tapes accommodated in the respective paired cassette tapes with the reel hubs thereof mounted on the two pairs of reel shafts, and a second position, at which the magnetic heads and the pinch rollers are all in contact with the magnetic tapes accommodated in the paired cassette tapes; and a power transmitting means for selectively transmitting rotational power from the rotational power generating means to the two capstans and the two pairs of reel shafts.

A second object of the invention is to provide a magnetic recording tape driving apparatus, which has a simple construction to reduce the costs of manufacture and assembly and reduce the size of the apparatus and also permits accurate transmission of rotational power from one rotational power generating means to two pairs of reel shafts to drive magnetic recording tapes accommodated in the two cassette tapes mounted on two pairs of reel shafts.

The second object of the invention is attained by the provision of a magnetic tape driving apparatus noted above, in which the power transmitting means includes:

a movable gear for receiving the rotational power from the output shaft of the rotational power generating means through a gear means and movable between a first position and a second position in correspondence to the directions of rotation of the output shaft;

a movement blocking member provided on the orbit of movement of the movable gears between the first and second positions and movable between a first position, at which the movable gear is held at either the first position or the second position to prevent movement of the movable gear between the first and second positions, and a second position, spaced apart from the orbit of movement of the movable gear between the first and second positions to permit movement of the movable gear between the first and second positions;

a driving member for moving the movement blocking member to the first position in response to the movement of the head base plate to the first position and moving the movement blocking member to the second position in response to the movement of the head base plate to the second position;

a first gear train for meshing with the movable gear located at the first position thereof to transmit rotational power to one or another reel shaft of one pair of the two pairs of reel shafts and also to one of the two capstans corresponding to the one pair of reel shafts according to the direction of rotation of the output shaft of the rotational power generating means, thereby causing rotation of the one of the one pair of reel shafts in one direction and also causing rotation of the one capstan in one direction with rotation of the output shaft in one direction while causing rotation of the another of the one pair of reel shafts in the other direction and also causing rotation of the another capstan in the other direction with the rotation of the output shaft in the other direction; and a second gear train for meshing with the movable gear located at the second position thereof to transmit rotational power to one or another reel shaft of another pair of the two pairs of reel shafts and also to another one of the two capstans corresponding to the another pair of reel shafts according to the direction of rotation of the output shaft of the rotational power generating means, thereby causing rotation of the one of the another pair of the reel shafts in one direction and also causing rotation of the another capstan in one direction with the rotation of the output shaft in one direction while causing rotation of the another of the another pair of reel shafts in the other direction and also causing rotation of the another capstan in the other direction with the rotation of the output shaft in the other direction.

With the magnetic recording tape driving apparatus having the above construction according to the invention, the head base plate may be further movable to a third position where it is intermediate between the first position and the second position, at which third position the magnetic heads are all in contact with the magnetic recording tapes accommodated in the paired cassette tapes while the pinch rollers are all spaced apart from the magnetic recording tapes. In this case, it is desirable to set the movement blocking member to the first position by the driving member in response to the movement of the head base plate to the third position.

DETAILED DESCRIPTION OF THE PREFERRED EMBODIMENTS

Figure 1:
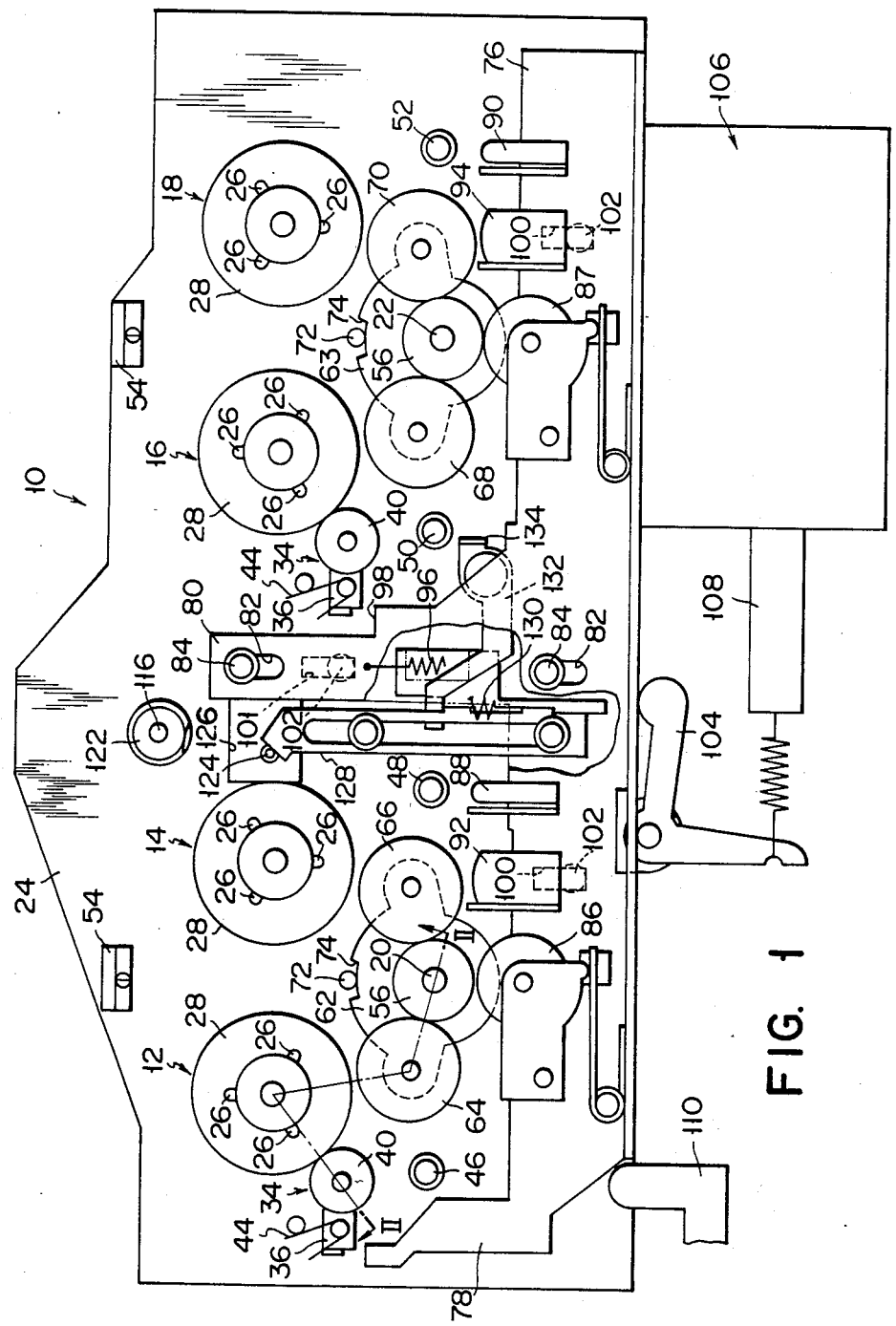
FIG. 1 is a plan view, partly broken away, showing an embodiment of the magnetic recording tape driving apparatus according to the invention.
Figure 2:
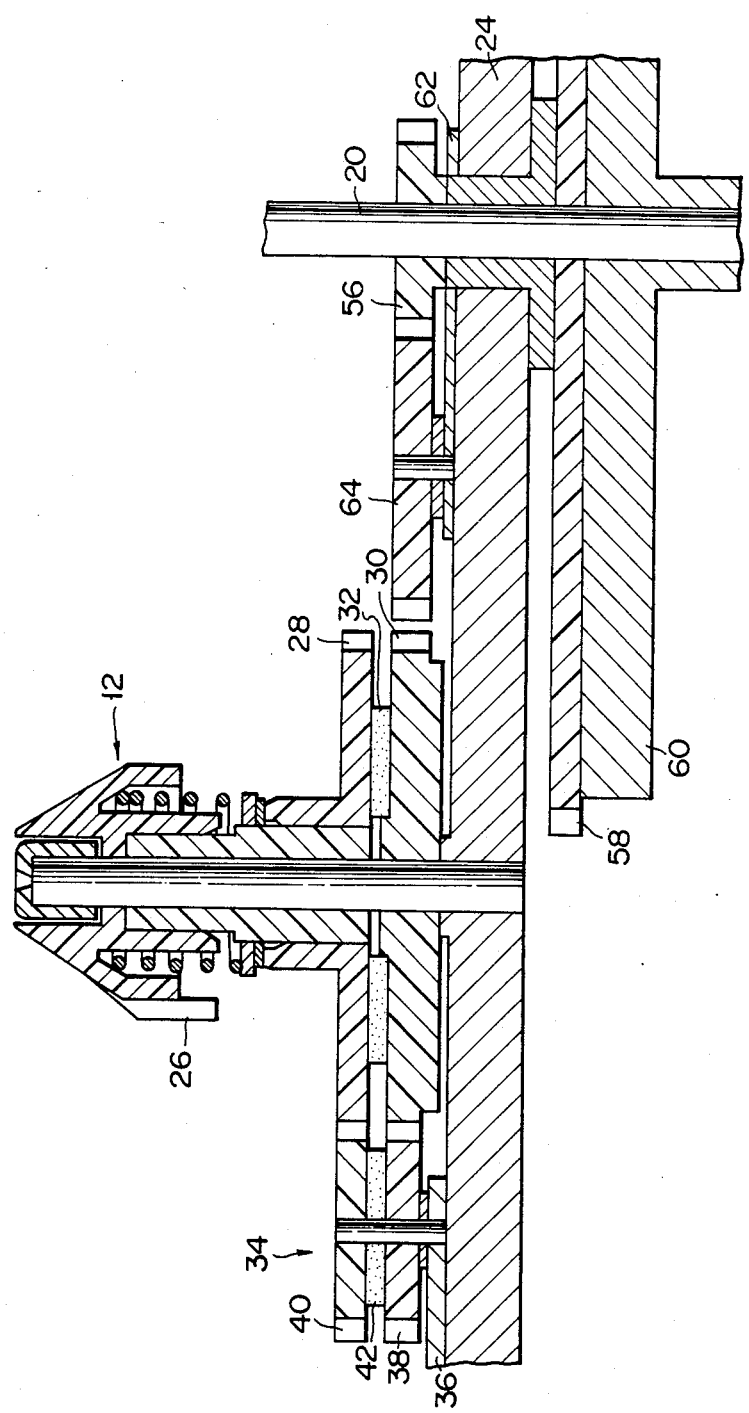
FIG. 2 is a sectional view taken along line II—II in FIG. 1.

The magnetic recording tape driving apparatus 10 shown in FIG. 1 has a mounting plate 24, on the front surface of which are provided with first to fourth reel shafts 12, 14, 16 and 18, a first capstan 20 located below a position intermediate between the first and second reel shafts 12 and 14, and a second capstan 22 located below an intermediate position between the third and fourth reel shafts 16 and 18. The first and second capstans 20 and 22 are rotatably mounted on the mounting plate 24. As shown in FIGS. 1 and 2, the first reel shaft 12 includes a first gear 28 having a plurality of radially extending wings 26, a second gear 30 concentric with and rotatable relative to the first gear 28, and a slip member 32 interposed between the first and second gears 28 and 30. The slip member 32 can effect transfer of a torque, or a rotational power, less than a predetermined value between the first and second gears 28 and 30 by the frictional force. When a torque, or a rotational power, in excess of the predetermined value is applied, however, it slips and does not effect the transfer of the torque, or the rotational power, between the first and second gears 28 and 30. In the magnetic recording tape driving apparatus 10 shown in FIG. 1, the first and second gears 28 and 30 have the same diameter and same number of teeth, and the second to fourth reel shafts 14, 16 and 18 have the same structure as the first reel shaft 12.

As shown in FIGS. 1 and 2, an idler means 34 is provided adjacent to the first reel shaft 12. The idler means 34 includes a lever 36 having an intermediate portion rotatably mounted on the base plate 24, a first idler gear 38 rotatably mounted on one end of the lever 36, a second idler gear 40 concentric with a rotatable relative to the first idler gear 38, and an idler slip member 42 interposed between the first and second idler gears 38 and 40. The idler slip member 42 can effect transfer of a torque, or a rotational power, less than a predetermined value greater than the aforementioned predetermined value of the torque in case of the slip member 32 of the first reel shaft 12 between the first and second idler gears 38 and 40 by the frictional force. When a torque, or a rotational power, in excess of the predetermined value noted above, greater than the predetermined value in case of the slip member 32 of the first reel shaft 12 is received, the idler slip member 42 slips and does not effect transfer of the torque, or the rotational power, between the first and second idler gears 38 and 40. The idle means 34 further includes a biasing means 44, which biases the lever 36 and holds it at a position, at which the first and second idler gears 38 and 40 are in mesh with the respective second and first gears 30 and 28 of the first reel shaft 12. The position of the idler means 34 at this time is referred to as first position thereof. In the magnetic recording tape driving apparatus shown in FIG. 1, the first and second idler gears 38 and 40 have the same diameter and same number of teeth. As is seen from FIG. 1, another idler means 34 is provided adjacent to the third reel shaft 16. This idler means 34, like the first-mentioned one, has its lever 36 biased by a biasing means 44 to a position to hold first and second idler gears 38 and 40 in mesh with the respective second and first gears 30 and 28 of the third reel shaft 16.

As shown in FIG. 1, first to fourth cassette tape positioning pins 46, 48, 50 and 52 are provided on the front surface of the mounting plate 24 below the first to fourth reel shafts 12, 14, 16 and 18 and on the opposite sides of the first and second capstans 20 and 22.

Further, as shown in FIG. 1, cassette tape biasing leaf springs 54 are provided on the front surface of the mounting plate 24 above the midpoint between the first and second reel shafts 12 and 14 and above the midpoint between the third and fourth reel shafts 16 and 18.

A concentric small gear 56 is secured to each of the first and second capstans 20 and 22 on the front surface side of the mounting plate 24. A capstan large gear 58 and a flywheel 60, as shown in FIG. 2, are concentrically secured to each of the first and second capstans 20 and 22 on the back surface side of the mounting plate 24.

First and second rocking levers 62 and 63 have their intermediate portion rotatably mounted on the respective first and second capstans 20 and 22 on the front surface side of the mounting plate 24. Opposite ends of the first rocking lever 62, which is rotatably mounted on the first capstan 20, are found below the first and second reel shafts 12 and 14, respectively as shown in FIG. 2. First and second planetary small gears 64 and 66 are rotatably mounted on the opposite ends of the first rocking lever 62. These first and second planetary small gears 64 and 66 are flush in level with the second gear 30 of the first reel shaft 12, and hence also with the second gear 30 of the second reel shaft 14, and they are in mesh with the capstan small gear 56 of the first capstan 20. Likewise, opposite ends of the second rocking lever 63, which is rotatably mounted on the second capstan 22, are found below the respective third and fourth reel shafts 16 and 18, and third and fourth planetary small gears 68 and 70 are rotatably mounted on the opposite ends of the second rocking lever 63 such that they are flush in level with the second gears 30 of the third and fourth reel shafts 16 and 18, and they are in mesh with the capstan small gear 56 of the second capstan 22.

The first and second rocking levers 62 and 63 are each formed with a rockable range restriction notch 74, which serves to restrict the rockable range of the corresponding rocking lever in co-operation with a pin 72 secured to the front surface of the mounting plate 24. Thus, it is possible to prevent seizure of the first planetary small gear 46 of the first capstan 20 to the meshing second gear 30 of the first reel shaft 12, seizure of the second planetary small gear 66 of the first capstan 20 to the meshing second gear 30 of the second reel shaft 14, seizure of the third planetary small gear 68 of the second capstan 22 to the second gear 30 of the third reel shaft 16, and seizure of the fourth planetary small gear 70 of the second capstan 22 to the second gear 30 of the fourth reel shaft 18 when the first and second rocking levers 62 and 63 are rocked in either direction.

A transversally extending head base plate 76 is located on the front surface side of the mounting plate 24 and below the first and second capstans 20 and 22. The left end of the head base plate 76 is found below the first reel shaft 12 and has an idler means drive hook 78, which extends upwards up to a position where is spaced apart at a predetermined distance downward from the other end of the lever 36 of the idler means 34 adjacent to the first reel shaft 12.

The head base plate 76 also has an intermediate upward extension 80 upwardly extending between the second and third reel shafts 14 and 16. The intermediate upward extension 80 has two vertically extending guide slots 82 formed in a verticaly spaced-apart relation to each other. Two stationary pins 84 projecting from the mounting plate 24 are received in the respective guide slots 82. The head base plate 76 can be guided for vertical movement relative to the mounting plate 24 by the combination of the paired stationary pins 84 of the mounting plate 24 and the paired guide slots 82 of the head base 76.

First and second pinch rollers 86 and 87 are mounted on the front surface of the head base plate 76 below the respective first and second capstans 20 and 22. First and second erasing heads 88 and 90 are also mounted on the front surface of the head base plate 76 below the second and fourth cassette tape positioning pins 48 and 52. Further, first and second magnetic recording/reproducing heads 92 and 94 are mounted on the head base plate 76. These two heads 92 and 94 are located respectively between the first pinch roller 86 and the first erasing head 88 and between the second pinch roller 87 and the second erasing head 90.

In the magnetic recording tape driving apparatus 10 shown in FIG. 1, the first and second erasing heads 88 and 90 consist of electromagnets and provide the function of an erasing head when they are energized. Also, the first and second magnetic recording/reproducing heads 92 and 94 function either as magnetic recording heads or as magnetic reproducing heads according to a command from an electric circuit (not shown).

A biasing means 96, e.g., tension coil spring, is provided with its one end attached to the head base plate 76 at a position of weight balance between the first and second magnetic recording/reproducing heads 92 and 94. The other end of the biasing means 96 is led through openings formed in the head base plate 76 and the mounting plate 24 to the back side of the mounting plate 24 and secured thereto. The biasing means 96 biases the head base plate 76 downwards and also toward the front surface of the mounting plate 24.

The intermediate upward extension 80 of the head base plate 76 has an idler means driving hook 98, which is located at a position where is spaced apart at a predetermined distance downward from the other end of the lever 36 of the idler means 34 adjacent to the third reel shaft 16.

The mounting plate 24 has two vertically extending slots 100 with their center lines aligned to the vertical center lines of the first and second magnetic recording/reproducing heads 92 and 94, respectively, and it also has a vertically extending slot 101 with the center line thereof aligned to the vertical center line passing through the point of weight balance between the first and second magnetic recording/reproducing heads 92 and 94. Three balls 102 are each received in each of the slots 100 and 101. These balls have a diameter greater than the width of the slots, and they are in point contact with the back surface of the head base plate 76 which is urged toward the front surface of the mounting plate 24 by the biasing member 96. The head base plate 76 is thus spaced apart a fixed distance from the front surface of the mounting plate 24, while the freedom of its vertical movement is ensured by the combination of the paired stationary pins 84 and the paired guide slots 82.

A head base plate driving lever 104 is provided with its central portion rotatably mounted on the front surface of the mounting plate 24 and its one end in contact with the lower edge of the head base plate 76. The other end of the head base plate driving lever 104 is coupled to the free end of an actuating rod 108 of a plunger solenoid assembly 106 secured to the mounting plate 24.

A return blocking lever 110 is provided near the left end of the lower edge of the head base plate 76. The return blocking lever 110 can contact the lower edge of the head base plate 76 when the head base plate 76 moves upwards at a predetermined distance from the position shown in FIG. 1 and then the return blocking lever 110 moves to the right from the position shown in FIG. 1, thereby preventing the head base plate 76 from returning to the position of FIG. 1 from the upper position noted above.

Figure 3:
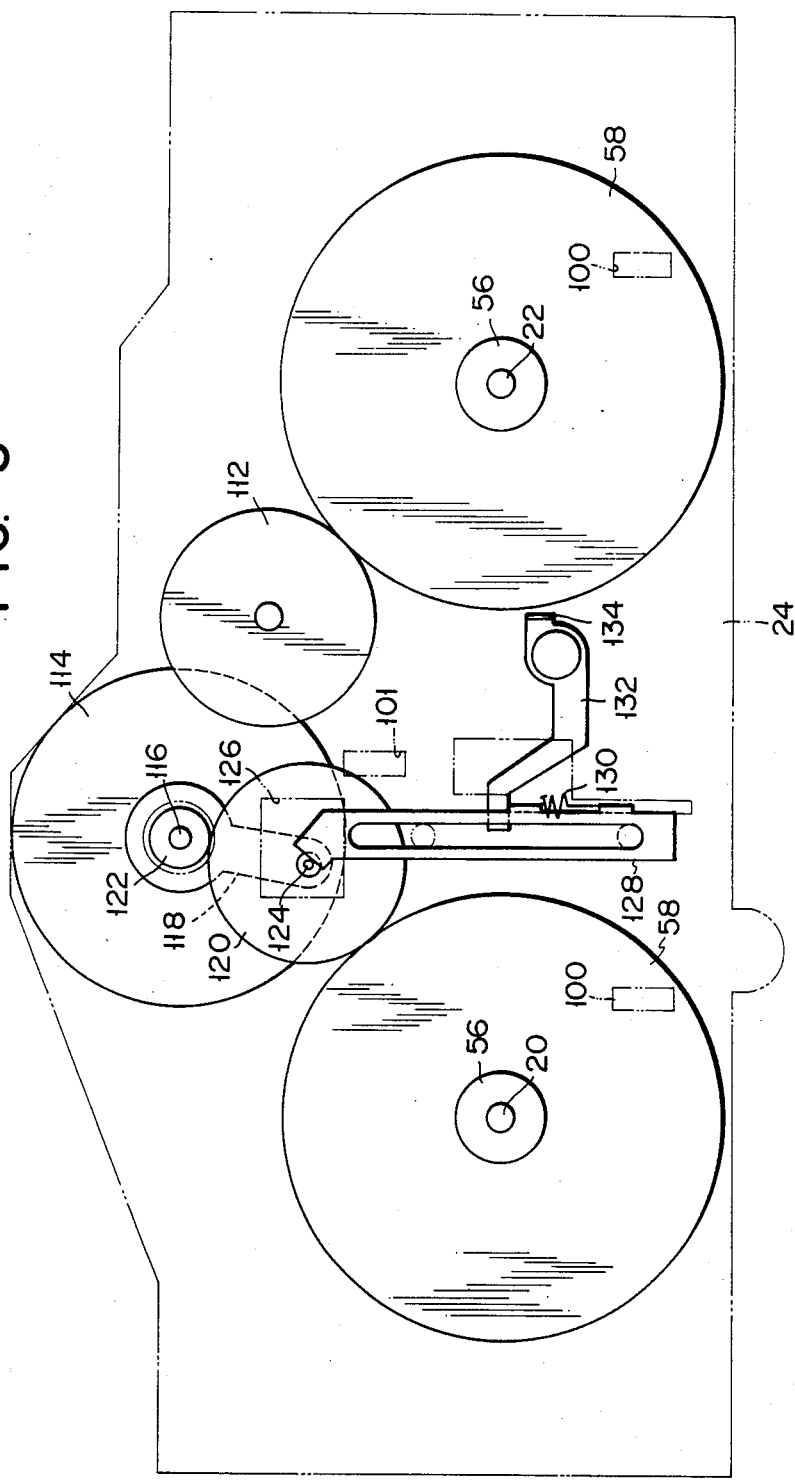
FIG. 3 is a plan view, taken in the same direction as FIG. 1, showing a back side of a mounting plate in an essential part of the embodiment of the magnetic recording tape driving apparatus shown in FIG. 1.

An idler gear 112 is provided on the back surface side of the mounting plate 24 and is in mesh with the capstan large gear 58 of the second capstan 22, as shown in FIG. 3. A motor 114 as a torque generating means, or a rotational power generating means, also provided on the back surface side of the mounting plate 24. The motor 114 is controlled by an electric circuit (not shown) for rotation at a predetermined high speed and also at a predetermined low speed in either direction. One end of a rocking lever 118 is rotatably mounted on an output shaft 116 of the motor 114, and a movable gear 120 is rotatably mounted on the other end of the rocking lever 118. The movable gear 120 is in mesh with a gear 122 concentrically secured to the output shaft 116 of the motor 114, for rotation about the output shaft 116 either in the clockwise direction or in the counterclockwise direction with the rotation of the output shaft 116 of the motor 114. The capstan large gear 58 of the first capstan 20 and the idler gear 112 of the second capstan 22 are provided on the orbit of movement of the movable gear 120. A pin 124, which is provided coaxially with the axis of rotation of the movable gear 120 penetrates an opening 126 formed in the mounting plate 24 and projects toward the front surface side of the mounting plate 24.

A movement blocking member 128 is provided to extend vertically along the intermediate upward extension 80 of the head base plate 76 on the front surface side of the mounting plate 24. The movement blocking member 128 is mounted on the front surface of the mounting plate 24 such that it can be moved in vertical directions under the guidance of a well-known guide means, such as a combination of stationary pins and guide slots in which the stationary pins are received. It is upwardly biased by a biasing means 130, e.g., a tension coil spring having one end attached to it and the other end attached to the front surface of the mounting plate 24. The movement blocking member 128 has a triangular upper end. When the left side edge of the triangular upper end is in a position to be in contact with the pin 124 of the movable gear 120, the movable gear 120 is in mesh with the capstan large gear 58 of the first capstan 20, as shown in FIG. 3, and also the rotation of the rocking lever 118, on which the movable gear 120 is mounted, in the counterclockwise direction is prevented. The positions of the movable gear 120 and the movement blocking member 128 at this time are referred to as their first positions.

A driving member 132 for moving the movement blocking member 128 against the biasing force of the biasing means 130 is mounted on the front surface of the mounting plate 24. The driving member 132 is a lever, which has one end engaged from above with a protuberance formed on the movement blocking member 128 and an intermediate portion rotatably mounted on the front surface of the mounting plate 24. The driving member 132 has an engaging projection 134 formed at the other end and extending away from the front surface of the mounting plate 24. As shown in FIG. 1, the engaging projection 134 is located at a predetermined distance above the upper edge of the head base plate 76.

The operation of the magnetic recording tape driving apparatus having the above construction will now be described.

Figure 4:
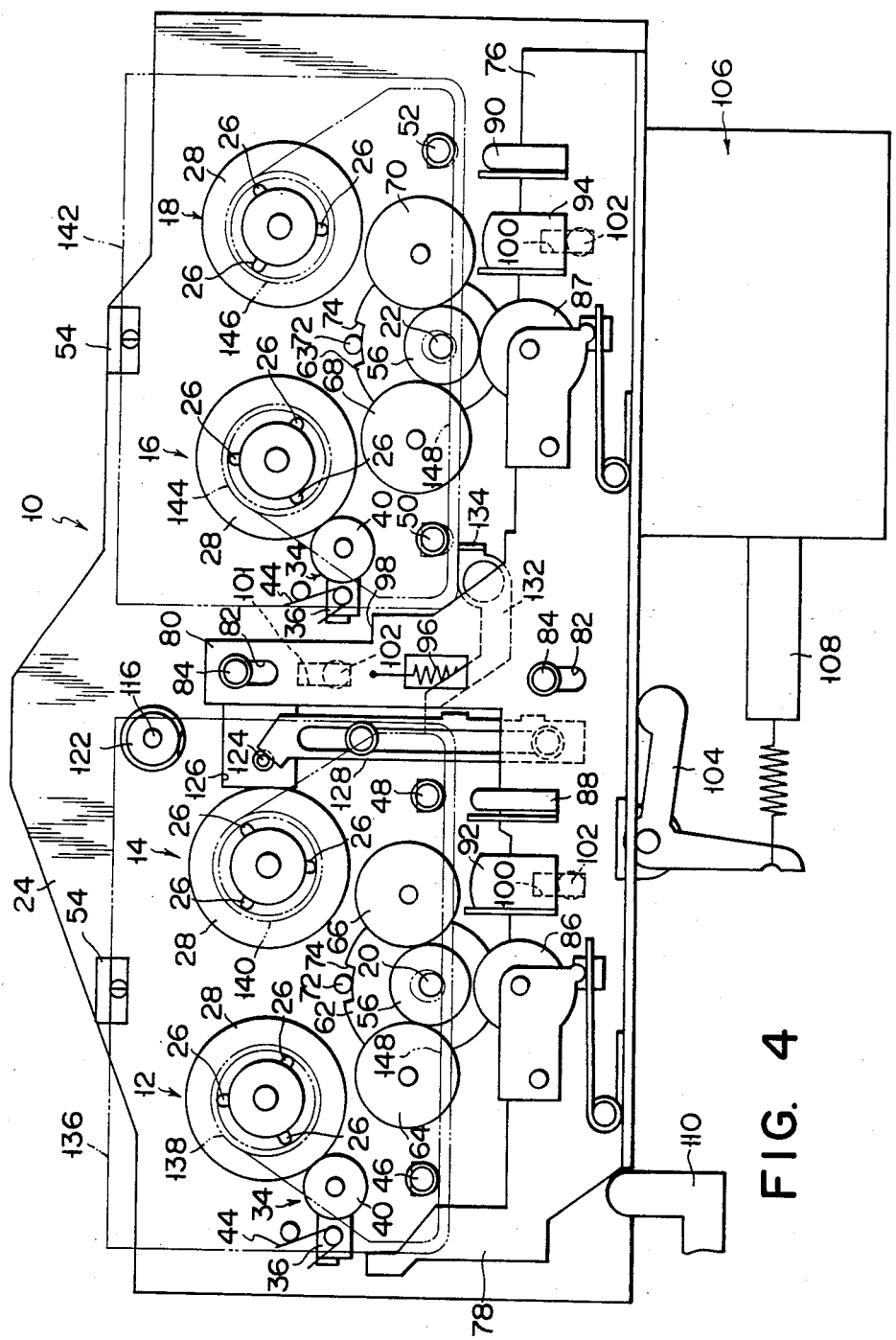
FIG. 4 is a plan view showing the essential part of the embodiment of the magnetic recording tape driving apparatus of FIG. 1 when two cassette tapes are mounted on first to fourth reel shafts and immediately before the two cassette tapes are separated from the first to fourth reel shafts.

FIG. 4 shows that paired reel hubs 138 and 140 of the first cassette tape 136 are mounted on the respective first and second reel shafts 12 and 14 and paired reel hubs 144 and 146 of the second cassette tape 142 are mounted on the third and fourth reel shafts 16 and 18. In this state, the first to fourth cassette tape positioning pins 46, 48, 50 and 52 are received in cassette tape positioning pin receiving holes formed in the first and second cassette tapes 136 and 142, and the first and second capstans 20 and 22 are received in the capstan receiving holes formed in the first and second cassette tapes 136 and 142. Also, in this state the first and second cassette tapes 136 and 142 are downwardly urged by the cassette tape biasing leaf springs 54 and are held in respective predetermined positions on the front surface side of the mounting plate 24 with the upper edges of the cassette tape positioning pin receiving holes in engagement with the periphery of the first to fourth cassette tape positioning pins 46, 48, 50 and 52.

In this state, the first and second pinch rollers 86 and 87, first and second magnetic recording/reproducing heads 92 and 94, and first and second erasing heads 89 and 90 provided on the head base plate 76, are found below the lower edge of the first and second cassette tapes 136 and 142 (windows for receiving the heads and pinch rollers being formed in the lower edge), as shown in FIG. 4. At this time, they are not in contact with magnetic recording tapes 148, which are accommodated in the first and second cassette tapes 136 and 142 and extending along the windows for receiving the heads and pinch rollers. The position of the head base plate 76 at this time is referred to as its first position. When the first and second cassette tapes 136 and 142 are set in the predetermined positions on the front surface of the mounting plate 24, as shown in FIG. 4, the electric circuit (not shown) is actuated by a detector (not shown) to energize the plunger solenoid assembly 106, thus causing a movement of the actuating rod 108 to the right. Thus, the head base plate driving lever 104 moves the head base plate 76 upwards from the first position shown in FIGS. 1 and 4 in rolling contact with the three balls 102 against the biasing force of the biasing means 96.

Figure 5:
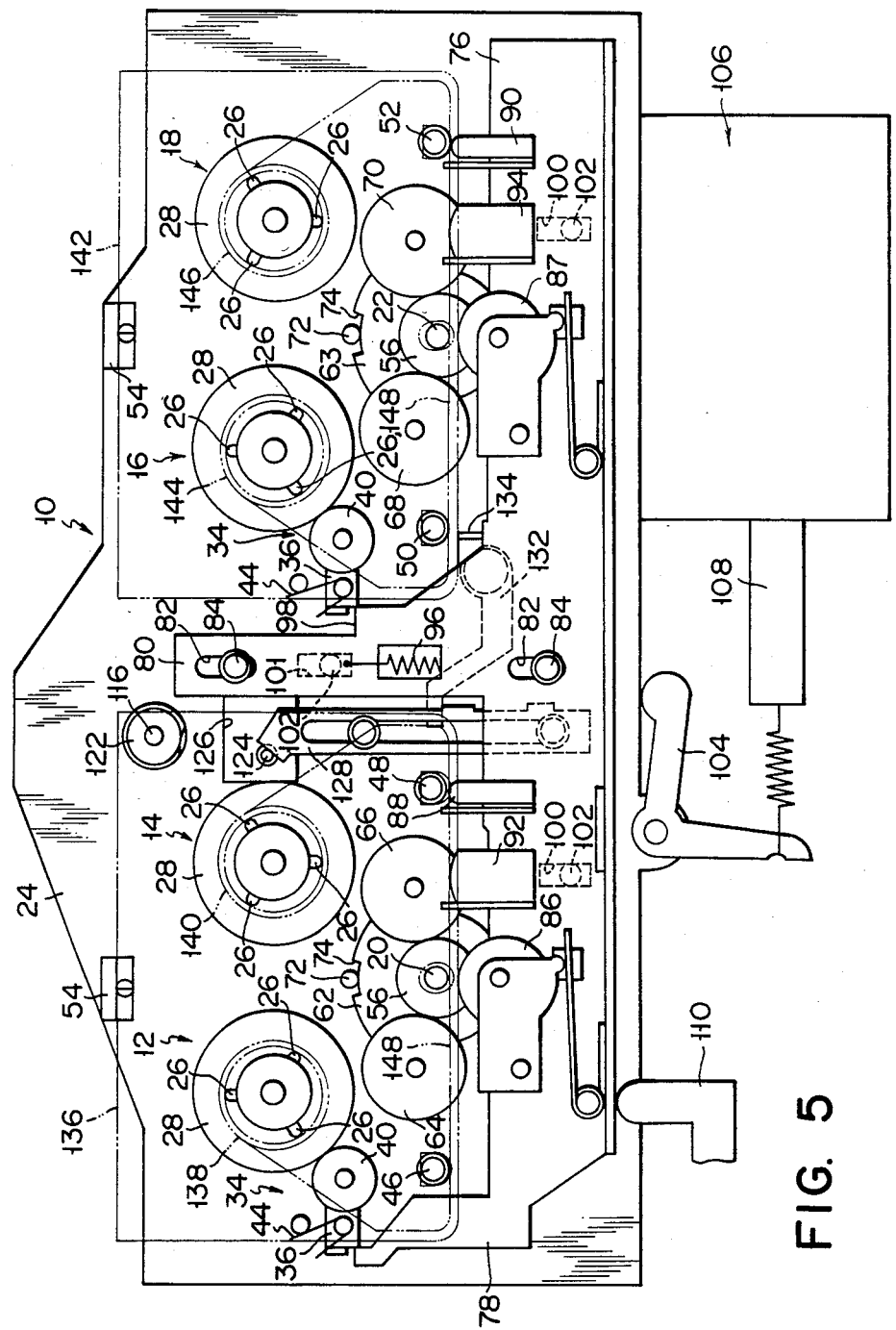
FIG. 5 is a plan view showing the essential part of the embodiment of the magnetic recording tape driving apparatus of FIG. 4 set to a stand-by mode.

The head base plate 76 is moved upwards from the first position by a predetermined distance to a position, at which the first and second magnetic recording/reproducing heads 92 and 94 and first and second erasing heads 88 and 90 are in contact with the magnetic recording tapes 148 accommodated in and extending along the lower edge of the first and second cassette tapes 136 and 142, as shown in FIG. 5. At this time, the first and second pinch rollers 86 and 87 are brought to a position where the pinch rollers 86 and 87 are out of contact with the magnetic recording tapes 148, and the return blocking lever 110 is moved to the right from the position shown in FIG. 4 to a position unde the lower edge of the head base plate 76. Then, the plunger solenoid assembly 106 is de-energized, whereupon the head base plate 76 tends to be moved downwards toward the first position shown in FIGS. 1 and 4 by the biasing force of the biasing means 96. However, the return blocking lever 110 that is now in contact with the lower edge of the head base plate 76 as shown in FIG. 5, prevents the downward movement of the head base plate 76. The head base plate 76 thus is held at the position shown in FIG. 5 in a state urged on the three balls 102. The state of the magnetic recording tape driving apparatus at this time is referred to as its stand-by mode.

Figure 6:
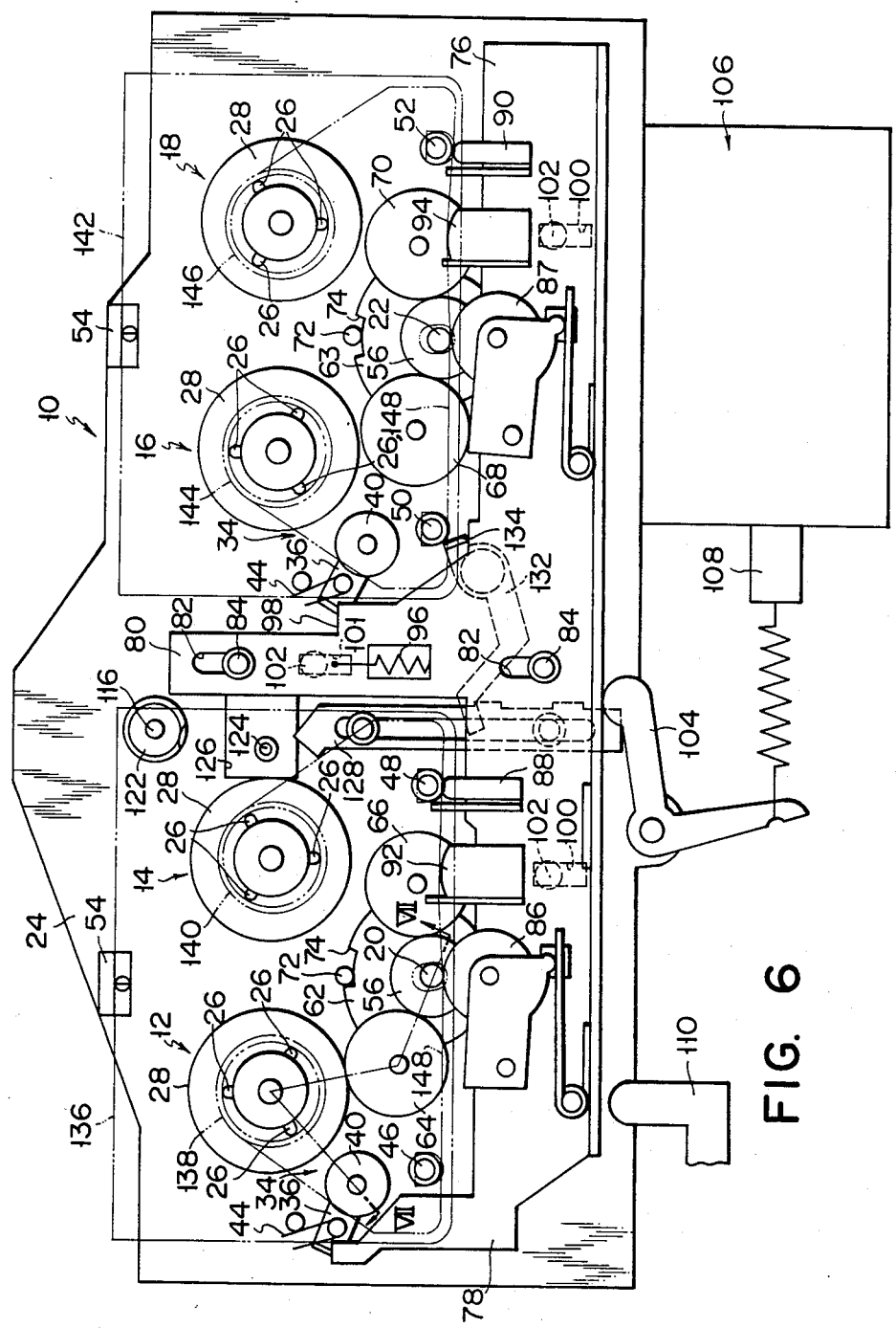
FIG. 6 is a plan view showing the essential part of the embodiment of the magnetic recording tape driving apparatus of FIG. 4 set to a first play mode or a first recording mode.

When a signal commanding the reproduction of magnetic signals from the magnetic recording tape 148 accommodated in the first cassette tape 136 is subsequently fed to the electric circuit (not shown) of the magnetic recording tape driving apparatus 10 (i.e., when a first play mode is set), the electric circuit energizes the plunger solenoid assembly 106 again to cause an upward movement of the head base plate 76 from the position shown in FIG. 5 in rolling contact with the three balls 102 against the biasing force of the biasing means 96. This upward movement of the head base plate 76 is stopped by the contact of the lower edges of the paired guide slots 82 of the head base plate 76 to the paired stationary pins 84 when it reaches a position, at which the first and second pinch rollers 86 and 87, first and second magnetic recording/reproducing heads 92 and 94, and first and second erasing heads 88 and 90 are all in contact with the magnetic recording tapes 148 accommodated in and extending along the lower edge of the first and second cassette tapes 136 and 142, as shown in FIG. 6. At this time, the head base plate 76 is in contact with the three balls 102, and the first and second pinch rollers 86 and 87 are pinching the magnetic recording tapes 148 in cooperation with the first and second capstans 20 and 22. The position of the head base plate 76 at this time is referred to as its second position.

Figure 7:
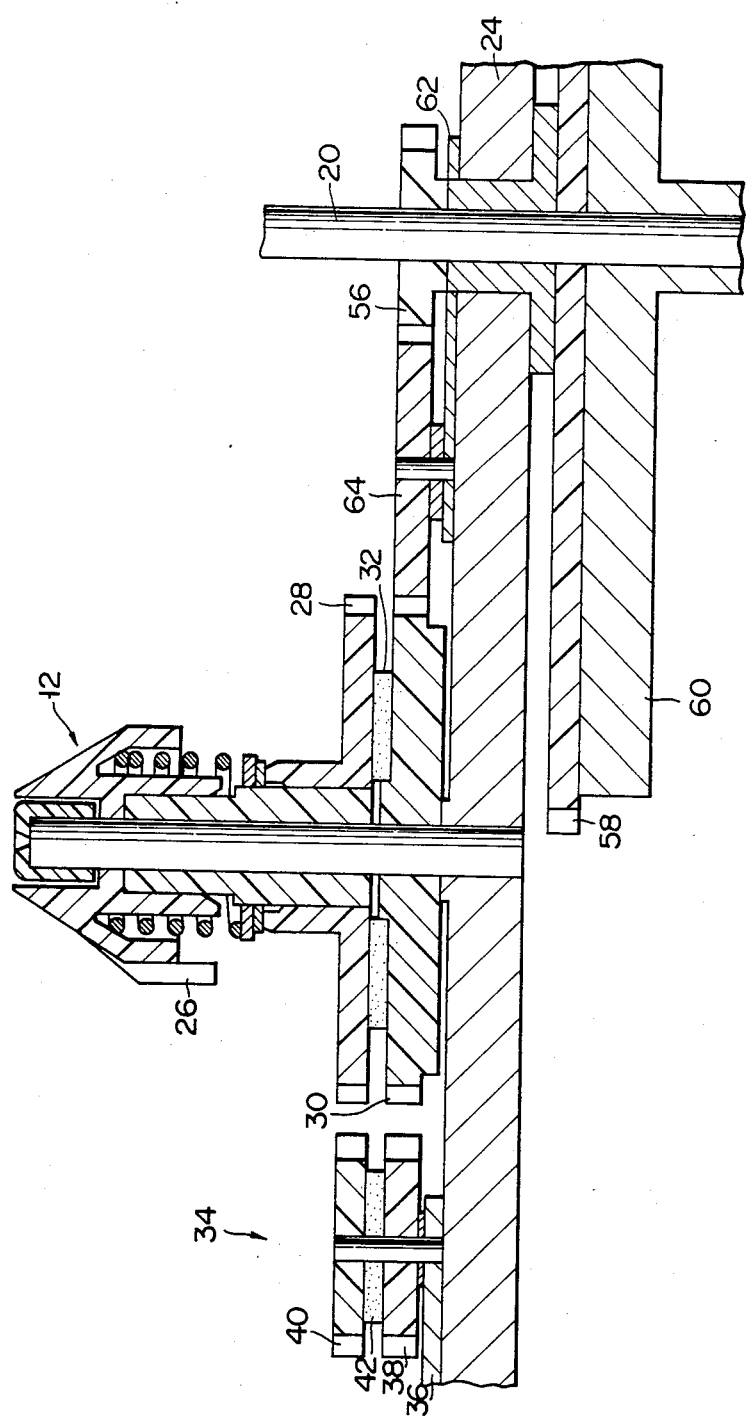
FIG. 7 is a sectional view taken along line VII—VII in FIG. 6.

When the head base plate 76 is brought to the second position shown in FIG. 6, the idler means driving hooks 78 and 98 provided on the head base plate 76 upwardly urge the other end of the levers 36 of the idler means 34 to cause a rotation of the lever 36 in the clockwise direction. As a result, the first and second idler gears 38 and 40 of each idler means 34 are separated from the first and second gears 28 and 30 of the first and third reel shafts 12 and 16, as shown in FIGS. 6 and 7. The position of the idler means 34 at the time is referred to as their second position.

When the head base plate 76 is brought to the second position shown in FIG. 6, the engaging projection 134 of the driving member 132 is upwardly urged by the upper edge of the head base plate 76. The driving member 132 is thus rotated in the counterclockwise direction to cause a downward movement of the movement blocking member 128 against the biasing force of the biasing means 130 (see FIGS. 1 to 3), so that the upper end thereof is brought to a position below the pin 124 of the movable gear 120. The position of the movement blocking member 128 at this time is referred to as the second position of the movement blocking member 128.

When the head base plate 76 is brought to the second position shown in FIG. 6 to set the first play mode, the first and second erasing heads 88 and 90 are not energized, so that they do not function as erasing heads. Also at this time, the electric circuit (not shown) controls the first and second magnetic recording/reproducing heads 92 and 94 to function as magnetic reproducing heads. Further at this time, the electric circuit controls the motor 114 (shown in FIG. 3) to rotate the output shafte 116 in the clockwise direction at a predetermined, comparatively low speed.

As a result, the movable gear 120 is driven together with the rocking lever 118 into mesh with the capstan large gear 58 of the first capstan 20, thus causing the rotation of the first capstan 20 in the clockwise direction at a predetermined, comparatively lower speed. At this time, the first and second planetary small gears 64 and 66 in mesh with the capstan small gear 56 of the first capstan 20 are rotated together with the first rocking lever 62 in the clockwise direction, thus bringing the first planetary small gear 64 into mesh with the second gear 30 of the first reel shaft 12, as shown in FIGS. 6 and 7. The torque, or the rotational power, from the motor 114 is thus transmitted from the first planetary small gear 64 to the second gear 30 of the first reel shaft 12 and then to the wings 26 of the first gear 28 of the first reel shaft 12 via the slip member 32. The magnetic recording tape 148 in the first cassette tape 136 is taken out from the periphery of the reel hub 140 on the second reel shaft 14 and taken up on the reel hub 138 or the first reel shaft 12 by the action of the first capstan 20 and the first pinch roller 86, and magnetic signals are reproduced from the magnetic recording tape 148 by the first magnetic recording/reproducing head 92 during this time.

When a signal commanding the recording of a new magnetic signal on the magnetic recording tape 148 accommodated in the first cassette tape 136 is further fed to the electric circuit (not shown) of the magnetic recording tape driving apparatus 10 after setting the first play mode described above (i.e., when a first recording mode is set), the electric circuit energizes the first erasing head 88 to cause the first erasing head 88 to function as the erasing head and also causes the first magnetic recording/reproducing head 92 to function as the magnetic recording head. Thus, a magnetic signal is recorded on the magnetic recording tape 148 driven at a constant, comparatively low speed from the reel hub 140 on the second reel shaft 14 to the reel hub 138 on the first reel shaft 12.

In the magnetic recording tape driving apparatus 10, it is possible to set the first recording mode from the stand-by mode shown in FIG. 5 directly, i.e., without setting the first play mode in advance.

Figure 8:
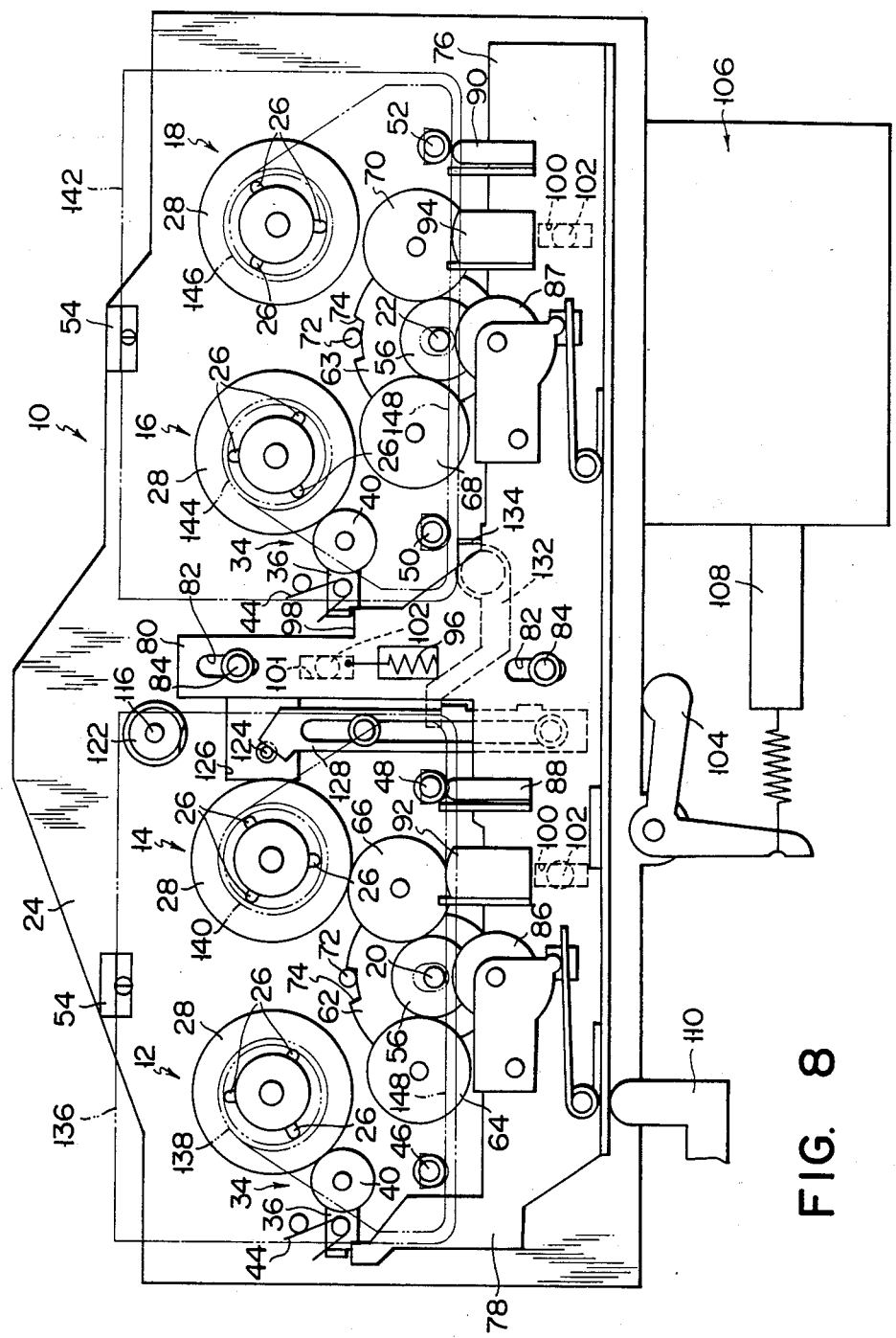
FIG. 8 is a plan view showing the essential part of the embodiment of the magnetic recording tape driving apparatus of FIG. 4 set to a first rewind mode.

When a signal commanding the rewinding of the magnetic recording tape 148 accommodated in the first cassette tape 136 at a comparatively high speed from the reel hub 138 on the first reel shaft 12 to the reel hub 140 on the second reel shaft 14 is fed to the electric circuit (not shown) of the magnetic recording tape driving apparatus 10 (i.e., when a first rewind mode is set), the electric circuit de-energizes the plunger solenoid assembly 106 to cause a downward movement of the head base plate 76 from the second position shown in FIG. 6 in rolling contact with the three balls 102 by the biasing force of the biasing means 96. The downward movement of the head base plate 76 is stopped when the lower edge of the head base plate 76 is brought into contact with the return blocking lever 110 as shown in FIG. 8. At this time, the head base plate 76 is in contact with three balls 102. The position of the head base plate 76 at this time is the same as the position of the head base plate 76 at the time of the stand-by mode as shown in FIG. 5. Thus, only the first and second magnetic recording/reproducing heads 92 and 94 and the first and second erasing heads 88 and 90 are in contact with the magnetic recording tapes 148 accommodated in and extending along the lower edge of the first and second cassette tapes 136 and 142, and the first and second pinch rollers 86 and 87 are not in contact with the magnetic recording tapes 148. The position of the head base plate 76 at this time is referred to as the third position thereof. Also at this time, the movement blocking member 128 and the paired idler means 34 are returned to the first position, as shown in FIG. 8. The first position is the same as that of the stand-by mode as shown in FIG. 5.

Further, when the head base plate 76 is brought to the third position shown in FIG. 8 to set the first rewind mode, the electric circuit (not shown) controls the motor 114 to rotate the output shaft 116 in the counterclockwise direction at a comparatively high speed.

The movable gear 120 is forced together with the rocking lever 118 in the counterclockwise direction. However, since the pin 124 of the movable gear 120 is in contact with the left edge of the upper end of the movement blocking member 128 located at the first position as shown in FIG. 8, the counterclockwise rotation of the rocking lever 118 and movable gear 120 is prevented, and the movable gear 120 continues to be in mesh with the capstan large gear 58 of the first capstan 20. Therefore, the first capstan 20 and the capstan small gear 50 are rotated in the counterclockwise rotation at a comparatively high speed, and hence the first and second planetary small gears 64 and 66 are rotated in the counterclockwise direction together with the first rocking lever 62, so that the second planetary small gear 66 is meshed with the second gear 30 of the second reel shaft 14. The torque, or the rotational power, from the motor 114 is thus transmitted from the second planetary small gear 66 to the second gear 30 of the second reel shaft 14 and then to the wings 26 of the first gear 28 of the second reel shaft 14 via the slip member 32, thus dirving the magnetic recording tape 148 in the first cassette tape 136 at a comparatively high speed from the reel hub 138 on the first reel shaft 12 to the reel hub 140 on the second reel shaft 14.

When a signal commanding the driving of the magnetic recording tape 148 accommodated in the first cassette tape 136 at a high speed from the reel hub 140 on the second reel shaft 14 to the reel hub 138 on the first reel shaft 12 is subsequently fed to the electric circuit (not shown) of the magnetic recording tape driving apparatus 10 (i.e., when a first fast-forward mode is set), the head base plate 76 is first brought to the same position, which is the same as at the time of the stand-by mode shown in FIG. 5 and also at the time of the first rewind mode as shown in FIG. 8, in contact with the three balls 102. At the same time, the electric circuit (not shown) controls the motor 114 shown in FIG. 3 to rotate the output shaft 116 in the clockwise direction at a comparatively high speed.

Figure 9:
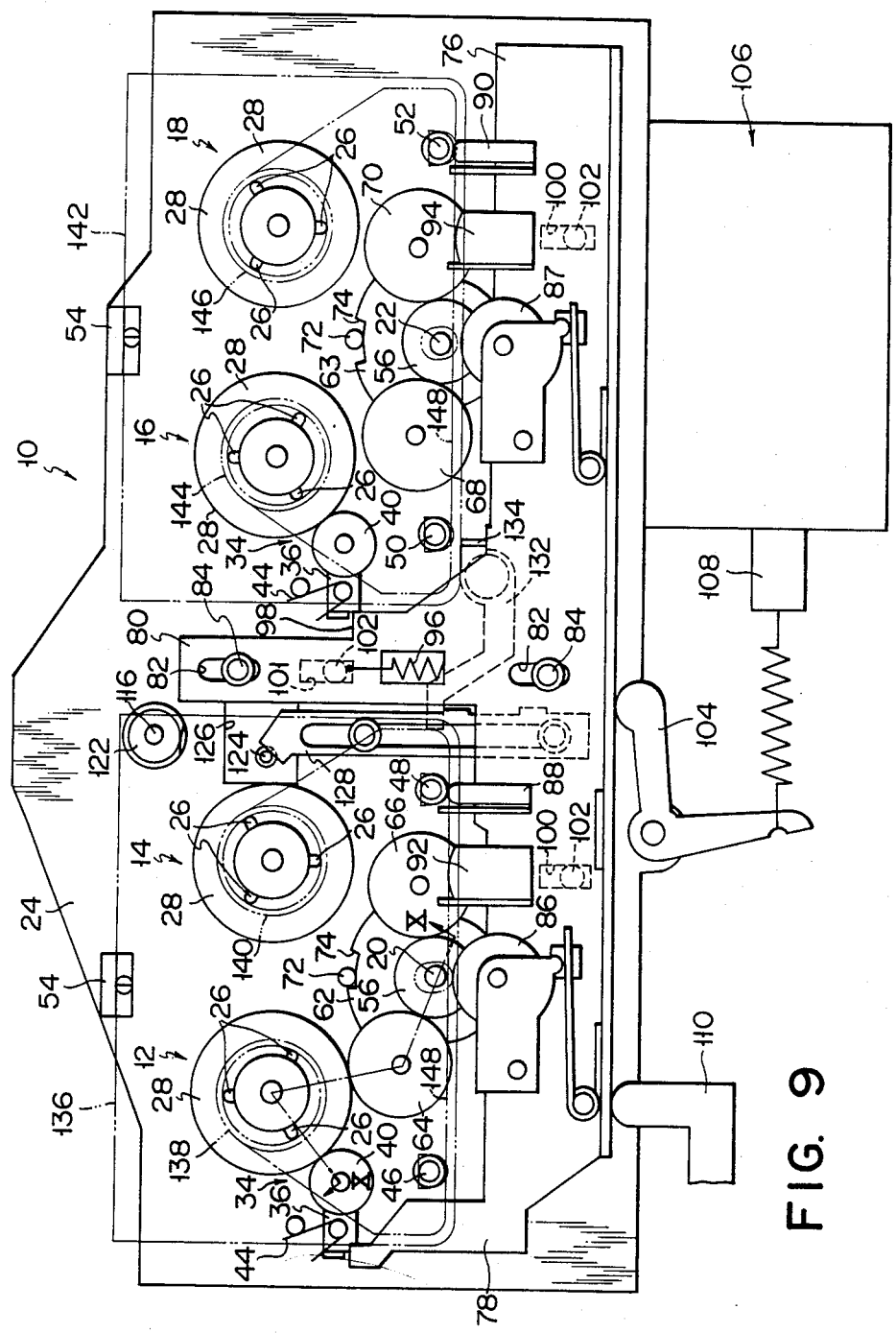
FIG. 9 is a plan view showing the essential part of the embodiment of the magnetic recording tape driving apparatus of FIG. 4 set to a first fast-forward mode.
Figure 10:
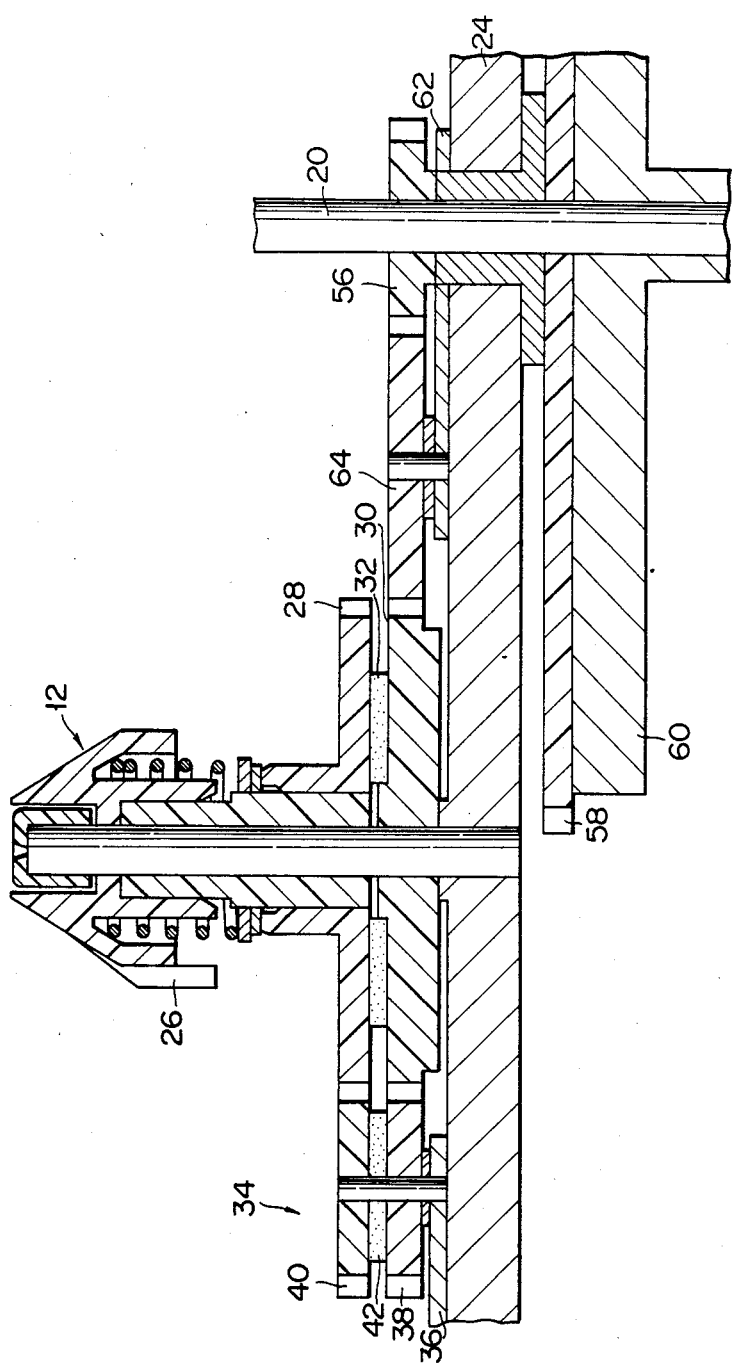
FIG. 10 is a sectional view taken along line X—X in FIG. 9.

As a result, the movable gear 120 is forced together with the rocking lever 118 in the clockwise direction so that it is countinually in mesh with the capstan large gear 58 of the first capstan 20. Therefore, the first capstan 20 and the capstan small gear 56 are rotated in the clockwise direction at a comparatively high speed, and hence the first and second planetary small gears 64 and 66 are rotated together with the first rocking lever 62 in the clockwise direction, so that the first planetary small gear 64 is brought into mesh with the second gear 30 of the first reel shaft 12 as shown in FIG. 9. The torque, or the rotational power, from the motor 114 is thus transmitted from the first planetary small gear 64 to the second gear 30 of the first reel shaft 12 and then to the wings 26 of the second gear 28 of the first reel shaft 12 via the first idler small gear 38, idler slip member 42, and second idler small gear 40 of the idler means 34 as shown in FIG. 10. The magnetic recording tape 148 in the first cassette tape 136 thus can be driven at a comparatively high speed from the reel hub 140 on the second reel shaft 14 to the reel hub 138 on the first reel shaft 12 without slip of the slip member 32 even with the first magnetic recording/reproducing head 92 and the first erasing head 88 in contact with the magnetic recording tape 148 as shown in FIG. 9. When the magnetic recording tape 148 is stopped with the end of its feeding from the periphery of the reel hub 140 on the second reel shaft 14, a slip occurs in the idler slip member 42 of the idler means 34. Therefore, the torque, or the rotational power, from the motor 114 is not continually transmitted to the magnetic recording tape 148, so that there is no possibility of the breaking or releasing of the end of the magnetic recording tape 148 secured to the supply side reel hub, i.e., the reel hub 140 on the second reel shaft 14.

When a signal commanding the reproduction of magnetic signals recorded on the magnetic recording tape 148 accommodated in the second cassette tape 142 is subsequently fed to the electric circuit (not shown) of the magnetic recording tape driving apparatus 10 (i.e., when a second play mode is set), the head base plate 76 is first brought to the second position shown in FIG. 6 in contact with the three balls 102 by the action of the plunger-solenoid assembly 106. Also at this time, the electric circuit (not shown) causes the second magnetic recording/reproducing head 94 to function as the magnetic reproducing head, while it does not cause the second erasing head 90 to function as the erasing head.

Figure 11:
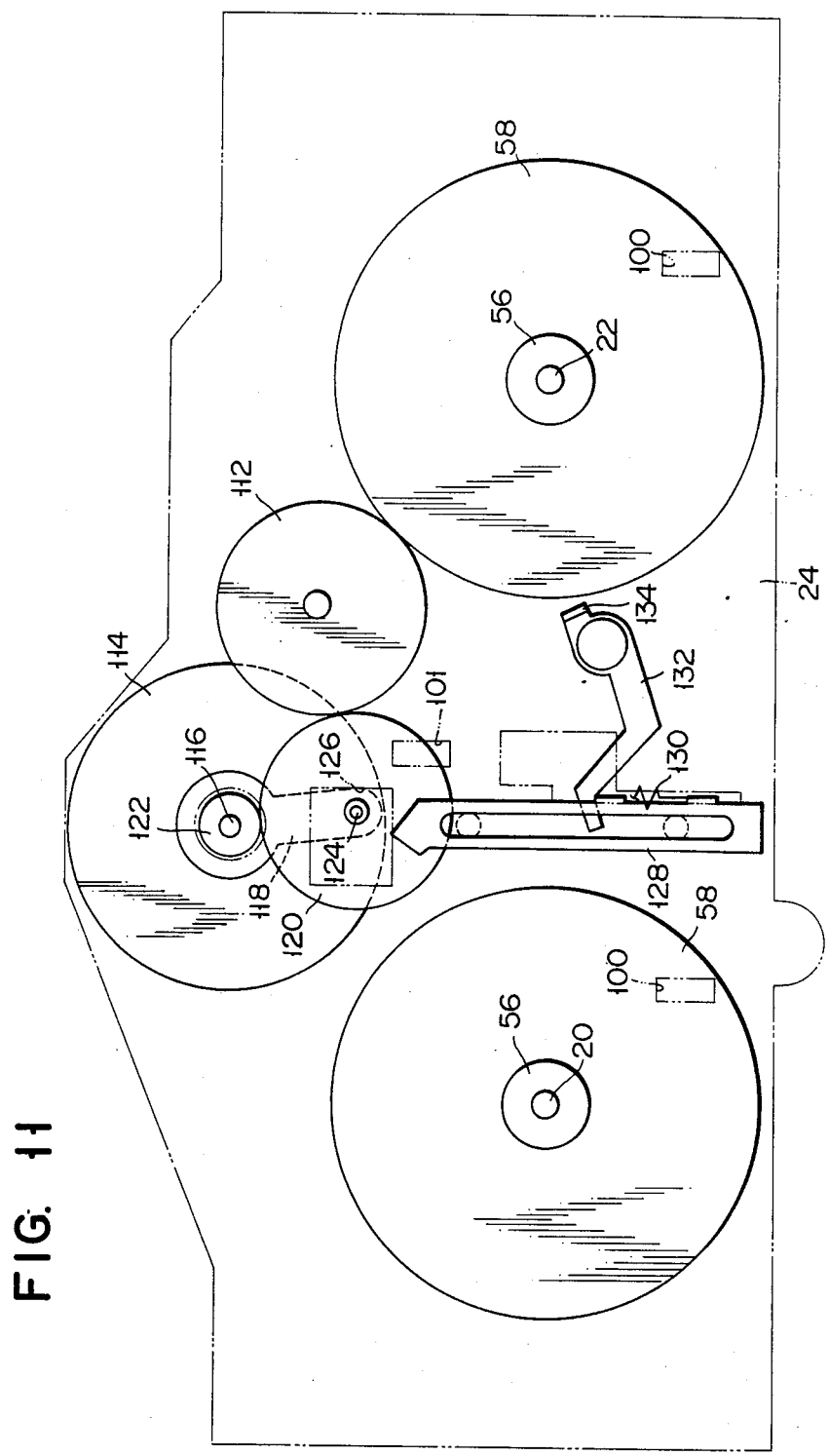
FIG. 11 is a plan view similar to FIG. 3 but showing the back side of the mounting plate in the essential part of the embodiment of the magnetic recording tape driving apparatus when the embodiment of the magnetic recording tape driving apparatus of FIG. 4 is set to a second play mode or a second recording mode.

The electric circuit (not shown) further controls the motor 114 shown in FIG. 11 to rotate the output shaft 116 in the counterclockwise direction at a predetermined, comparatively low speed.

Figure 12:
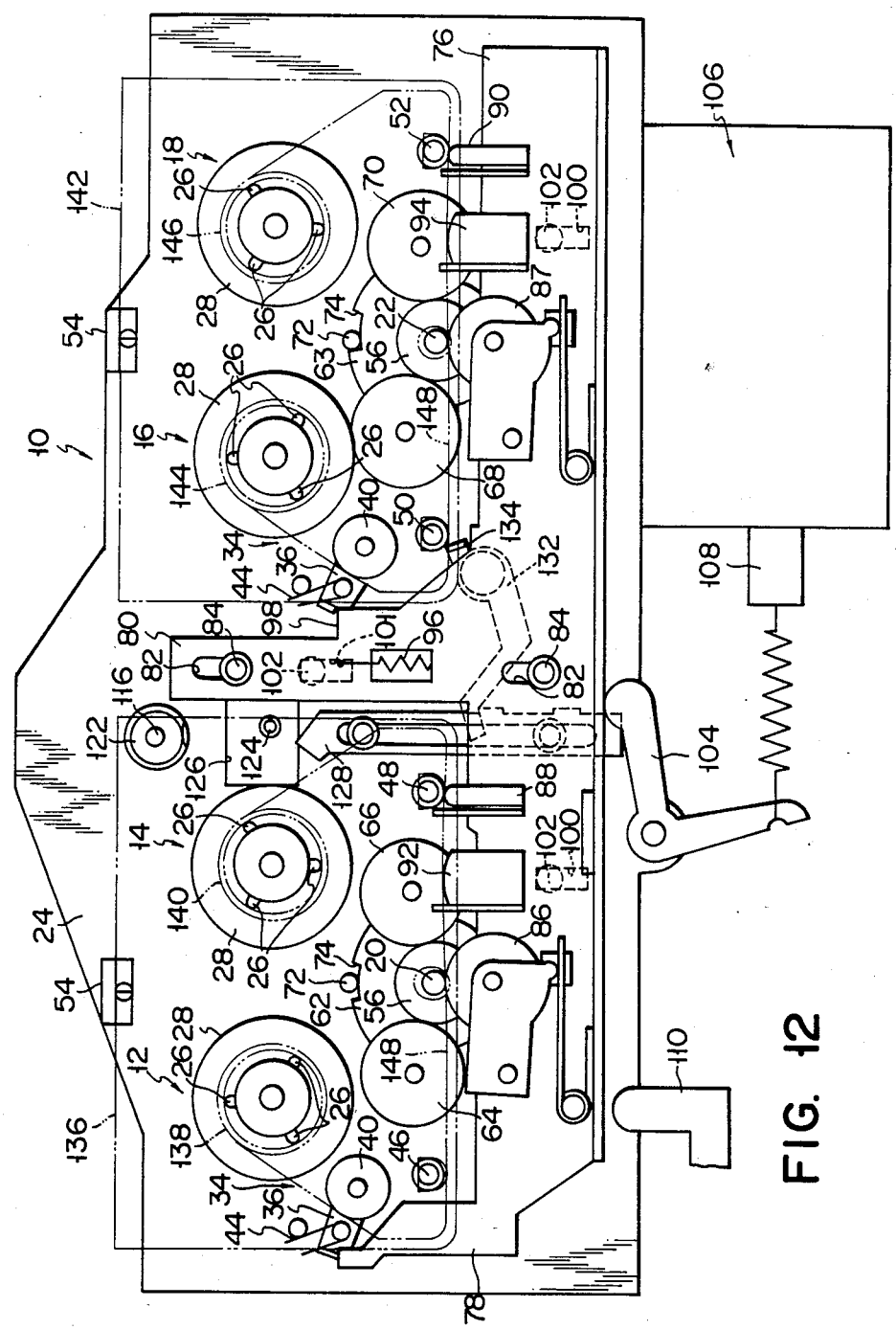
FIG. 12 is a plan view showing the essential part of the embodiment of the magnetic recording tape driving apparatus set to a second play mode or a second recording mode.

As a result, the movable gear 120 is forced together with the rocking lever 118 and brought into mesh with the idler gear 112 of the second capstan 22 as shown in FIG. 11, thus causing the rotation of the second capstan 22 in the clockwise direction at a predetermined, comparatively low speed. In this embodiment, the idler gear 112 and the movable gear 120 have the same diameter and same number teeth. At this time, the third and fourth planetary small gears 68 and 70 that are in mesh with the capstan small gear 56 of the second capstan 22, are rotated together with the second rocking lever 63 in the clockwise direction, so that the third planetary small gear 68 is brought into mesh with the second gear 30 of the third reel shaft 16 as shown in FIG. 12. The torque, or the rotational power, from the motor 114 is thus transmitted from the third planetary small gear 68 to the second gear 30 of the third reel shaft 16 and then to the wings 26 of the first gear 28 of the third reel shaft 16 via the slip member 32. Thus, the magnetic recording tape 148 in the second cassette tape 142 is taken out from the periphery of the reel hub 146 on the fourth reel shaft 18 and taken up on the reel hub 144 on the third reel shaft 16 by the action of the second capstan 22 and the second pinch roller 87, and magnetic signals are reproduced by the second magnetic recording/reproducing head 94 during this time.

When a signal commanding the recording of new magnetic signal on the magnetic recording tape 148 in the second cassette tape 142 is fed to the electric circuit (not shown) of the magnetic recording tape driving apparatus 10 (i.e., when a second recording mode is set), the electric circuit energizes the second erasing head 90 to cause the second erasing head 90 to function as the erasing head and also it causes the second magnetic recording/reproducing head 94 to function as the magnetic recording head. A new magnetic signal is thus recorded on the magnetic recording tape 148 which is being driven at a constant, comparatively low speed from the reel hub 146 on the fourth reel shaft 18 to the reel hub 144 on the third reel shaft 16.

When a signal commanding the rewinding of the magnetic recording tape 148 in the second cassette tape 142 at a comparatively high speed from the reel hub 144 on the third reel shaft 16 to the reel hub 146 on the fourth reel shaft 18 is subsequently fed to the electric circuit (not shown) of the magnetic recording tape driving apparatus 10 (i.e., when a second rewind mode is set), the electric circuit de-energizes the plunger-solenoid assembly 106, thus causing a downward movement of the head base plate 76 from the position shown in FIG. 12 in rolling contact with the three balls 102 by the biasing force of the biasing means 96. This downward movement of the head base 76 is stopped when the lower edge thereof comes into engagement with the return blocking lever 110, which has already been brought to be under the lower edge of the head base plate 76. At this time, the head base plate 76 is in contact with the three balls 102, and the head base plate 76 is held at the same position thereof as at the time of the stand-by mode shown in FIG. 5. Thus, at this time only the first and second magnetic recording/reproducing heads 92 and 94 and the first and second erasing heads 88 and 90 are in contact with the magnetic recording tapes 148 accommodated in and extending along the lower edge of the first and second cassette tapes 136 and 142, and the first and second pinch rollers 86 and 87 are not in contact with the tapes 148. The position of the head base plate 76 at this time is the third position thereof. Also at this time, as shown in FIG. 13, the paired idler means 34 have been returned to the first position, which is the same as their position at the time of the stand-by mode as shown in FIG. 5, and the right edge of the upper end of the movement blocking member 128 is in engagement of the pin 124 of the movable gear 120.

Figure 13:
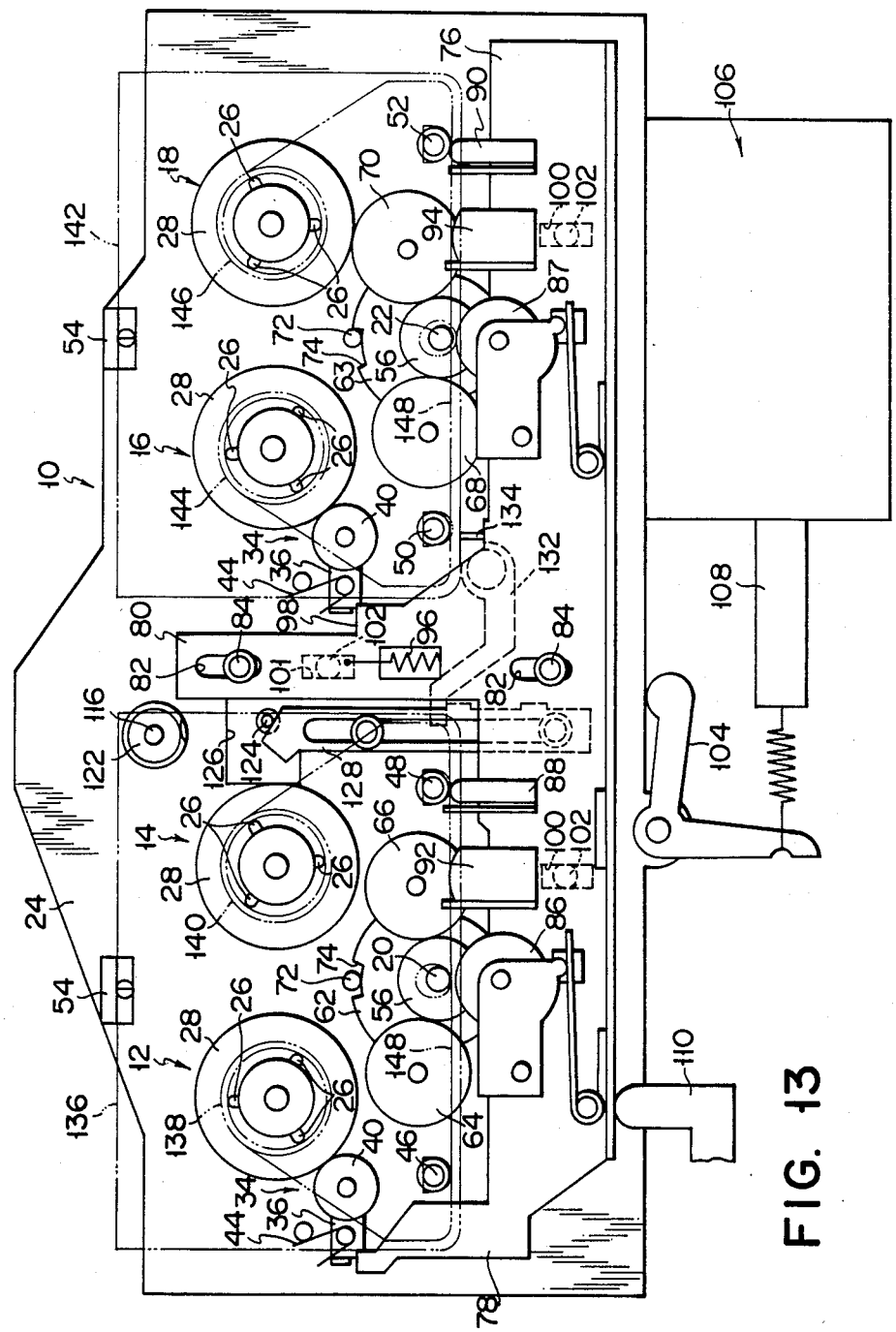
FIG. 13 is a plan view showing the essential part of the magnetic recording tape driving apparatus of FIG. 4 set to a second rewind mode.

Further, when the head base plate 76 is brought to the third position as shown in FIG. 13 to set the second rewind mode, the electric circuit (not shown) controls the motor 114 shown in FIG. 11 to rotate the output shaft 116 in the clockwise direction at a comparatively high speed.

As a result, the movable gear 120 is forced together with the rocking lever 118 in the clockwise direction. However, since the pin 124 of the movable gear 120 is in contact with the right edge of the upper end of the movement blocking member 128, the movable gear 120 is prevented from the clockwise rotation and continues to be in mesh with the idler gear 112. The second capstan 22 and the capstan small gear 56 are thus rotated in the counterclockwise direction at a comparatively high speed, and hence the third and fourth planetary small gears 68 and 70 are rotated together with the second rocking lever 63 in the counterclockwise direction, so that the fourth planetary small gear 70 is brought into mesh with the second gear 30 of the fourth reel shaft 18, as shown in FIG. 13. The torque, or the rotational power, from the motor 114 is thus transmitted from the fourth planetary small gear 70 to the second gear 30 of the fourth reel shaft 18 and then to the wings 26 of the second gear 28 of the fourth reel shaft 18 via the slip member 32. The magnetic recording tape 148 in the second cassette tape 142 is thus driven at a comparatively high speed from the reel hub 144 on the third reel shaft 16 to the reel hub 146 on the fourth reel shaft 18.

When a signal commanding the driving of the magnetic recording tape 148 in the second cassette tape 142 at a high speed from the reel hub 146 on the fourth reel shaft 18 to the reel hub 144 on the third reel shaft 16 (i.e., when a second fast-forward mode is set), first the head base plate 76 is brought to the third position, the same as at the time of the second rewind mode as shown in FIG. 13, in contact with the three balls 102. The electric circuit (not shown) then controls the motor 114 shown in FIG. 11 to rotate the output shaft 116 in the counterclockwise direction at a comparatively high speed.

Figure 14:
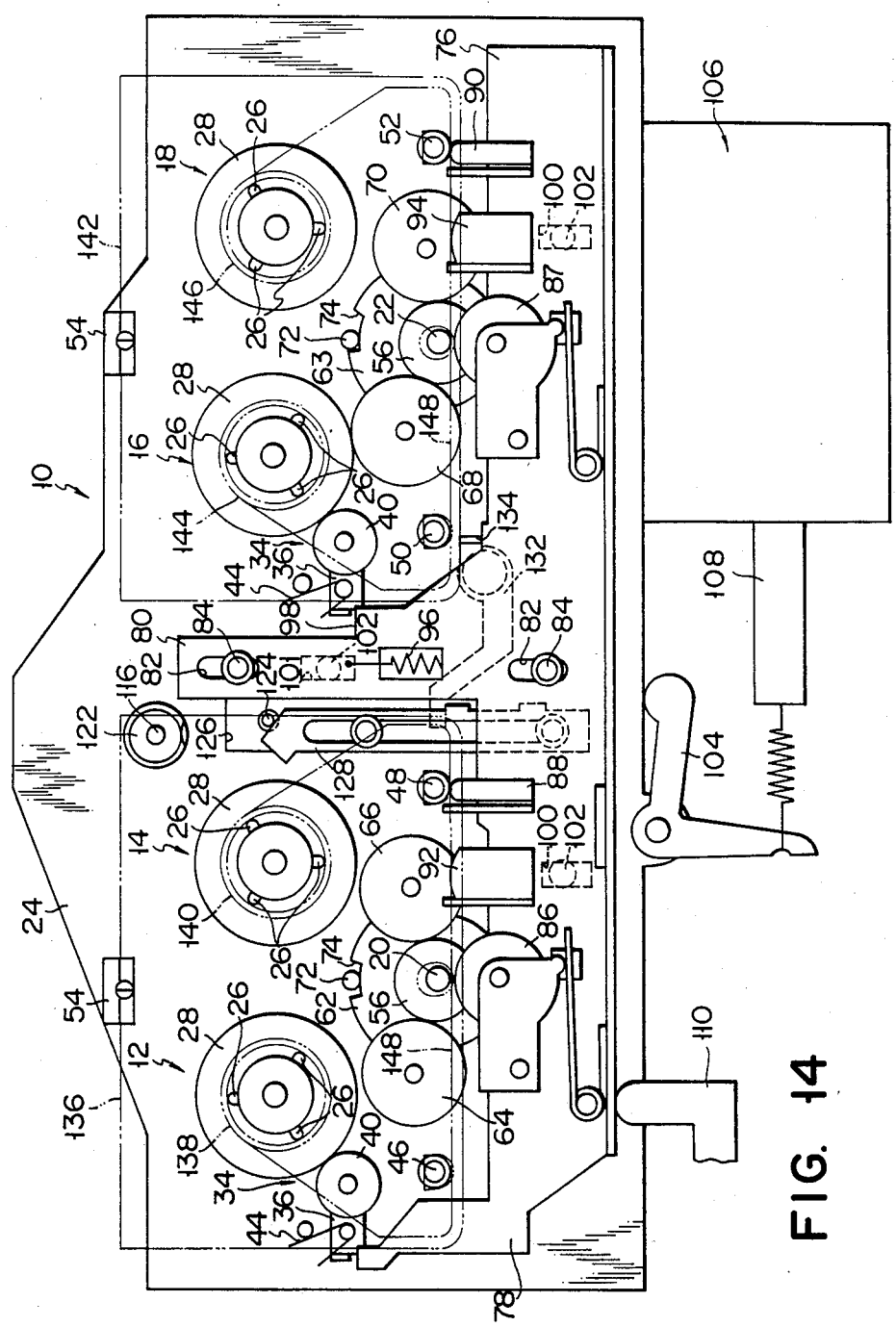
FIG. 14 is a plan view showing the essential part of the embodiment of the magnetic recording tape driving apparatus of FIG. 4 set to a second fast-forward mode.

The movable gear 120 is thus forced together with the rocking lever 118 in the clockwise direction. However, since the pin 124 of the movable gear 120 is in contact with the right edge of the upper end of the movement blocking member 128 located at the first position as shown in FIG. 14, the clockwise rotation of the movable gear 120 and rocking lever 118 is prevented, and the movable gear 120 continues to be in mesh with the idler gear 112. The second capstan 22 and the capstan small gear 56 are thus rotated in the clockwise direction at a comparatively high speed, and hence the third and fourth planetary small gears 68 and 70 are rotated together with the second rocking lever 63 in the clockwise direction, so that the third planetary small gear 68 is brought into mesh with the second gear 30 of the third reel shaft 16 as shown in FIG. 14. The torque, or the rotational power, from the motor 114 thus is transmitted from the third plantery small gear 68 to the second gear 30 of the third reel shaft 16 and then to the wings 26 of the second gear 28 of the third reel shaft 16 via the first idler small gear 38, idler slip member 42, and second idler small gear 40 of the idler means 34 shown in FIG. 10. Thus, the magnetic recording tape 148 in the second cassette tape 142 can be driven at a comparatively high speed from the reel hub 146 on the fourth reel shaft 18 to the reel hub 144 on the third reel shaft 16 without occurrence of a slip of the slip member 32 even with the second magnetic recording/reproducing head 94 and the second erasing head 90 being in contact with the magnetic recording tape 148 accomodated in the second cassette tape 142 as shown in FIG. 14. When the magnetic recording tape 148 is stopped at the end of its feeding from the periphery of the reel hub 146 on the third reel shaft 18, a slip occurs in the idler slip member 42 of the idler means 34. Therefore, the torque, or the rotational power, from the motor 114 is not continually transmitted to the magnetic recording tape 148, so that there is no possibility of the breaking or releasing of the end of the magnetic recording tape 148 secured to the supply reel hub, i.e., the reel hub 146 on the fourth reel shaft 18.

Finally, when a signal commanding the removal of the first and second cassette tapes 136 and 142 from the first to fourth reel shafts 12, 14, 16 and 18 is fed to the electric circuit (not shown) of the magnetic recording tape driving apparatus 10 (i.e., an eject mode is set), the electric circuit de-energizes the plunger solenoid assembly 106, and also causes a leftward movement of the return blocking member 110 to a position spaced apart from the underside of the lower edge of the head base plate 76 as shown in FIG. 4. As a result, the head base plate 76 is moved downwards in rolling contact with the three balls 102 by the biasing force of the biasing means 96 to be returned to the first position shown in FIG. 4. In this state, the first and second pinch rollers 86 and 87, first and second magnetic recording/reproducing heads 92 and 94, and first and second erasing heads 88 and 90 are located below the lower edge of the first and second cassette tapes 136 and 142 (where the windows for receiving the head and the pinch rollers are formed). Thus, the first and second cassette tapes 136 and 142 can be removed from the first to fourth reel shafts 12, 14, 16 and 18 without the first and second pinch rollers 86 and 87, first and second magnetic recording/reproducing heads 92 and 94, and first and second erasing heads 88 and 90 being touched by them.

The magnetic recording tape driving apparatus 10 as described above, can be utilized as, for instance, an answering service machine, which is coupled to a telephone set for automatically answering a call when it is set to do so. In this use, the apparatus 10 is connected to the telephone set and is set to the stand-by mode. When an electric circuit (not shown) detects a call to the telephone set, the mode of the magnetic recording tape driving apparatus 10 is switched to the first play mode. As a result, an absentee's message is transmitted from the magnetic recording tape 148 in the first cassette tape 136 through the answering service machine to the caller.

When the transmission of the message is ended, the electric circuit (not shown) sets the magnetic recording tape driving apparatus 10 to the stand-by mode, stops the reproduction of magnetic signal from the magnetic recording tape 148 in the first cassette tape 136, and stops the driving of the tape 148 while the telephone circuit is set up. At the same time, the electric circuit sets the apparatus 10 to the second record mode. As a result, a message from the caller to the absentee is recorded as new magnetic signal on the magnetic recording tape 148 in the second cassette tape 142. When the electric circuit detects the release-down of the telephone circuit, that is the end of the recording of the message from the caller, it records a cue signal on the magnetic recording tape 148 in the second cassette tape 142, and then sets the magnetic recording tape driving apparatus 10 to the stand-by mode. As a result, the recording of a new magnetic signal on the magnetic recording tape 148 in the second cassette tape 142 is stopped, and also the driving of the tape 148 is stopped. After the stand-by mode is set, the electric circuit sets the apparatus 10 to the first rewind mode. As a result, the magnetic recording tape 148 in the first cassette tape 136 is rewound up to the position of the start of the message of the absentee. As soon as the tape 148 has been rewound up to the position of the start of the absentee's message, the electric circuit sets the magnetic recording tape driving apparatus 10 to the stand-by mode in preparation for a new call.

The user of the magnetic recording tape driving apparatus 10 can record the user's message on the magnetic recording tape 148 of the first cassette tape 136 by setting the apparatus 10 to the first record mode. Also the user can quickly check the contents of the caller's message by setting the apparatus 10 to the first fast-forward mode and also causing the first magnetic recording/reproducing head 92 to function as a reproducing head.

Further, when the user goes out, the user can listen to a caller's message recorded during the absence through the telephone set of the user's destination by calling the user's telephone set and setting the magnetic recording tape driving apparatus 10 to the second rewind mode and then second play mode by transmitting a particular signal to the electric circuit of the apparatus 10 through the telephone circuit.

Further, when the user calls the magnetic recording tape driving apparatus 10 from the user's destination, a prompt search can be made of a plurality of caller's messages and cue signals subsequent thereto recorded on the magnetic recording tape 148 of the second cassette tape 142 by setting the apparatus 10 to the second fast-forward mode while causing the second magnetic recording/reproducing head 94 to function as a reproducing head by transmitting a particular signal to the electric circuit of the apparatus 10. Thus, it is possible to sort out a particular message among a plurality of messages in a very short time so as to repeatedly listen to the message.

Of course the user can set the magnetic recording tape driving apparatus 10 to the second rewind mode and then to the second play mode without the agency of any other telephone set but by manually operating the apparatus 10. Further, it is possible to cause the second magnetic recording/reproducing head 94 to function as a reproducing head simultaneously with the setting of the second fast-forward mode.

Furthermore, the user in the destination can erase the plurality of caller's messages and subsequent cue signals recorded on the magnetic recording tape 148 in the second cassette tape 142 through the telephone set of the destination by setting the magnetic recording tape driving apparatus 10 to the second rewind mode while also causing the second erasing head 90 to function as an erasing head by transmitting a particular signal to the electric circuit of the apparatus 10 by making use of the telephone circuit, so that the messages may no longer be heard by the third party.

Of course the user can set the magnetic recording tape driving apparatus 10 to the second rewind mode and cause the second erasing head 90 as an erasing head without the agency of any other telephone set but by manually operating the apparatus 10.

Figure 15:
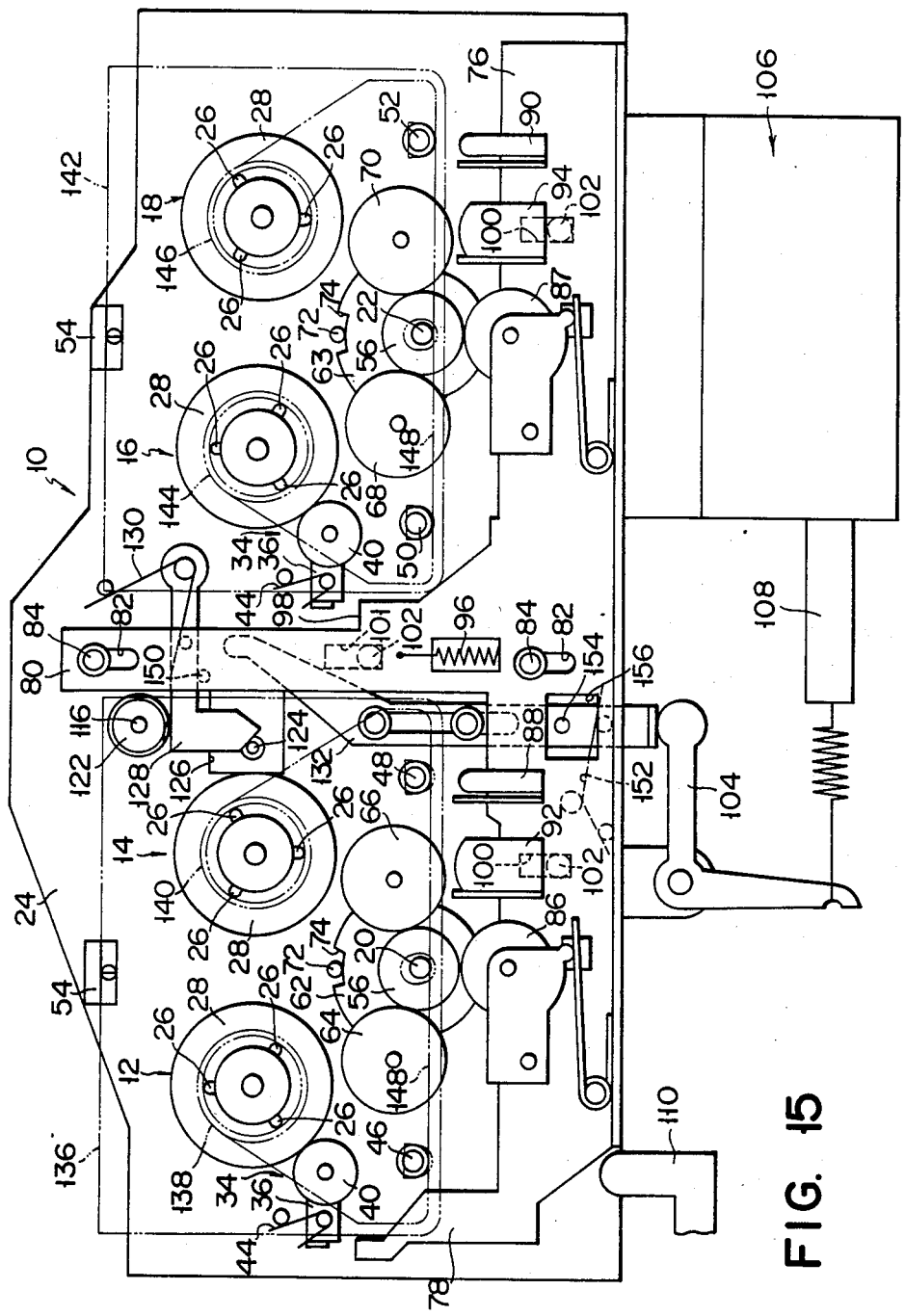
FIG. 15 is a plan view showing a modification of the essential part of the magnetic recording tape driving apparatus of FIG. 4 with two cassette tapes mounted on first to fourth reel shafts.
Figure 16:
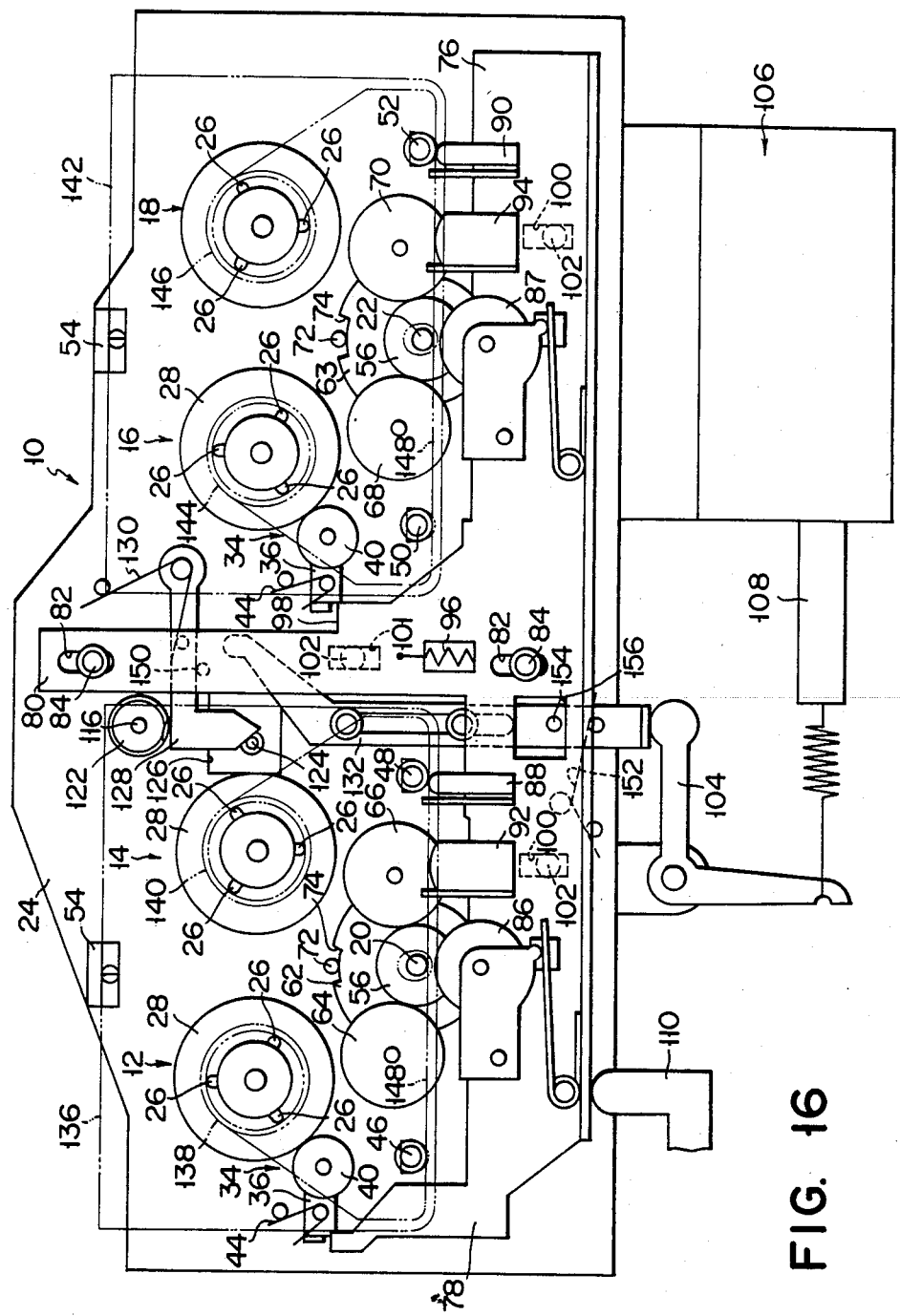
FIG. 16 is a plan view showing the modification of the essential part of the magnetic recording tape driving apparatus shown in FIG. 15 set to a stand-by mode.
Figure 17:
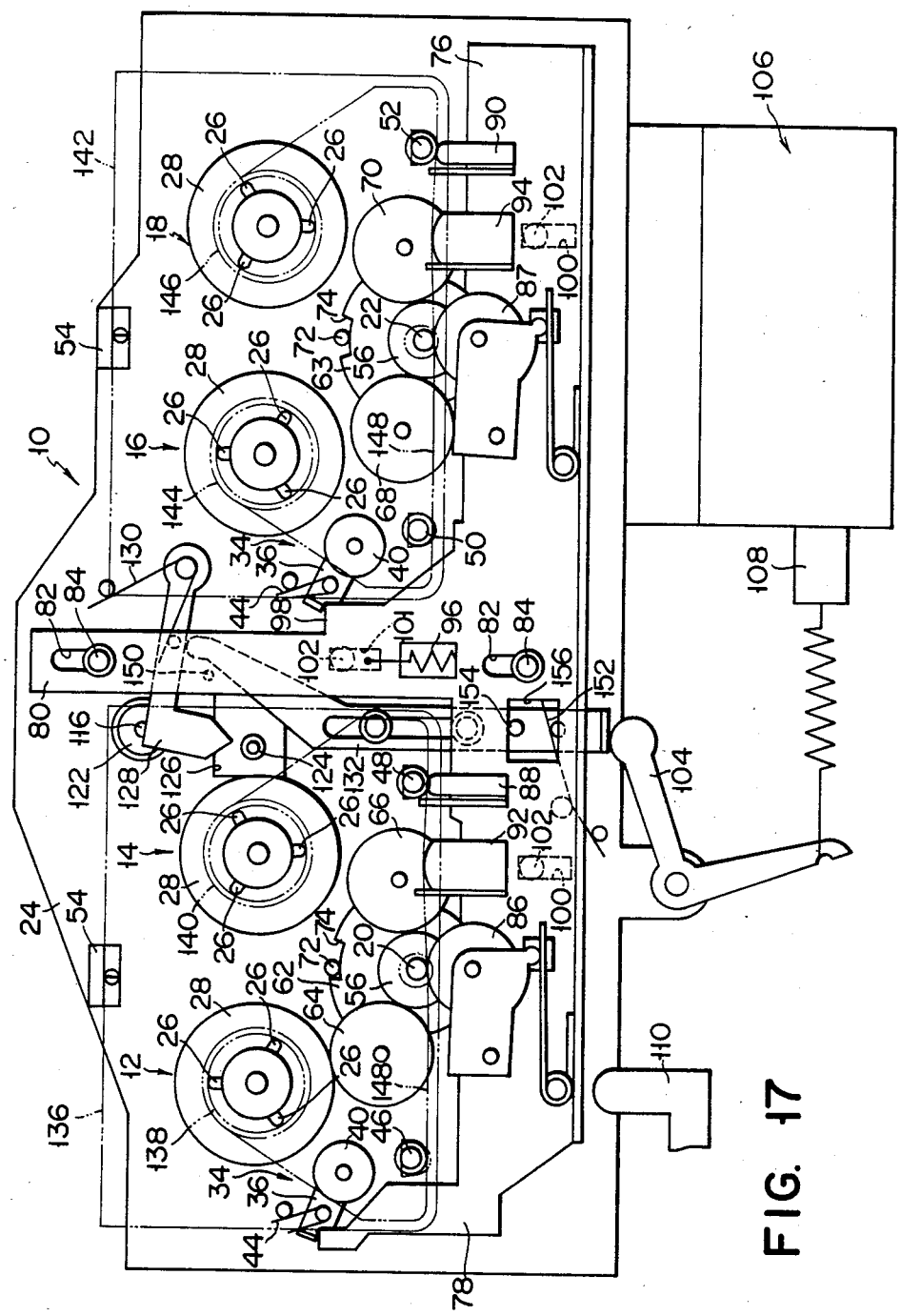
FIG. 17 is a plan view showing the modification of the essential part of the magnetic recording tape driving apparatus shown in FIG. 15 set to a first play mode or first recording mode.

Now, a modification of the magnetic recording tape driving apparatus 10 will be described with reference to FIGS. 15 to 17. In FIGS. 15 to 17 parts like or corresponding to those in FIGS. 1 to 14 are denoted by the same reference numerals, and detailed description of these parts is no longer made.

In this modification, the movement blocking member 128 is a transversally extending lever as shown in FIG. 15. The right end of the movement blocking member 128 is rotatably mounted on the front surface of the mounting plate 24. Its left end has a downwardly pointed triangular shape with the left edge thereof in contact with the pin 124 of the movable gear 120. The position of the movable gear 120 at this time is the first position thereof. Also, the position of the movement blocking member 128 at this time is the first position thereof. In this modification, the movement blocking member 128 is biased in the counterclockwise direction by a biasing means 130, but it is held in the first position by contacting a stopper pin 150.

In this modification, the driving member 132 is a vertically extending lever as shown in FIG. 15. The driving member 132 is mounted on the front surface of the mounting plate 24 for vertical movement by well-known guide means such as a combination of guide slots and stationary pins received therein. It is biased by a biasing means 152, and is held in its lowermost position. The upper end of the driving member 132 is spaced apart downwards from the lower edge of the movement blocking member 128. Its lower end projects from the lower edge of the head base plate 76 and is in contact with the head base plate driving lever 104.

In this modification, the driving member 132 has a head base plate driving projection 154 projecting from its front surface as shown in FIG. 15. The head base plate driving projection 154 penetrates an opening 156 formed in the head base plate 76.

FIG. 15 shows a state immediately after the paired reel hubs 138 and 140 and 144 and 146 of the first and second cassette tapes 136 and 142 have been mounted on the first to fourth reel shafts 12, 14, 16 and 18 of the modification of the magnetic recording tape driving apparatus 10.

When this modification of the magnetic tape driving apparatus 10 is set to the stand-by mode, an electric circuit (not shown) energizes the plunger solenoid assembly 106. As a result, the driving member 132 is moved upwards against the biasing force of the biasing means 152 by the action of the actuating rod 108 and the head base plate driving lever 104, whereby the head base plate driving projection 154 of the upwardly moving driving member 132 is brought into contact with the upper edge of the opening 156 of the head base plate 76 and moves the head base plate 76 from the first position shown in FIG. 15 to a third position as shown in FIG. 16. Subsequently, the plunger solenoid assembly 106 is de-energized, whereupon the driving member 132 is returned to the lowermost position as shown in FIG. 15. However, the head base plate 76 is held in the third position against the biasing force of the biasing means 96 by the action of the return blocking member 110.

When the driving member 132 is moved upwards to move the head base plate 76 from the first position to the third position, the plunger-solenoid assembly 106 is de-energized before the upper end of the driving member 132 is brought into contact with the lower edge of the horizontally extending portion of the movement blocking member 128, so that the movement blocking member 128 is not rotated from the first position shown in FIG. 15.

When the modification of the magnetic recording tape driving apparatus 10 is subsequently set to either first play mode, first recording mode, second play mode or second recording mode, the electric circuit (not shown) energizes the plunger-solenoid assembly 106. As a result, the driving member 132 is upwardly moved against the biasing force of the biasing means 152 by the action of the actuating rod 108 and the head base plate driving lever 104. The head base plate driving projection 154 of the upwardly moving driving member 132 is brought into contact with the upper edge of the opening 156 of the head base plate 76 as shown in FIG. 16 and moves the head base plate 76 from the third position shown in FIG. 16 to the second position shown in FIG. 17 against the biasing force of the biasing means 96.

The head base plate 76 is held in the second position with the plunger-solenoid assembly 106 continually held energized. When the head base plate 76 is moved from the third position shown in FIG. 16 to the second position shown in FIG. 17, the upper end of the driving member 132 is brought into contact with the lower edge of the horizontal portion of the movement blocking member 128 and causes rotation of the movement blocking member 128 in the clockwise direction from the first position shown in FIGS. 15 and 16 against the biasing force of the biasing means 130. At this time, the lower end of the downwardly extending left end portion of the movement blocking member 128 is moved to a position above the orbit of movement of the pin 124 of the movable gear 120, when the movable gear 120 moves between the first and second positions, thereby permitting movement of the movable gear 120 between the first and second positions. The position of the movement blocking member 128 at this time is the second position thereof.

In this modification, the driving member 132 may have an inverted T-shaped form so that it may be partly overlapped over the head base plate 76 between the head base plate 76 and the mounting plate 24. In this case, the driving member 132 is formed in its upwardly extending portion and horizontal portion with three slots 100, 100 and 101 at the same positions as the slots 100, 100 and 101 in the magnetic recording tape driving apparatus 10 shown in FIGS. 1 to 14, and balls 102 are received in the respective slots 100, 100 and 101. With this construction, it is possible to hold a constant level, from the front surface of the mounting plate 24, of the first and second magnetic recording/reproducing heads 92 and 94, first and second erasing heads 88 and 90, and first and second pinch rollers 86 and 87 carried by the head base plate 76 which moves between the first, second and third positions in rolling contact with the three balls 102. That is, the first and second magnetic recording/reproducing heads 92 and 94, first and second erasing heads 88 and 90, and first and second pinch rollers 86 and 87 may be reliably brought into contact with the magnetic recording tapes 148 accommodated in the first and second cassette tapes 136 and 142 mounted in the magnetic recording tape driving apparatus 10 at predetermined positions thereof.

What is claimed is:

1. A magnetic recording tape driving apparatus comprising:
   a rotational power generating means;
   two pairs of reel shafts, on which a pair of reel hubs of each of a pair of cassette tapes are mounted;
   two capstans each provided in a position corresponding to each pair of the reel shafts;
   a head base plate supporting two magnetic heads and two pinch rollers each provided in a position corresponding to each pair of the reel shafts and movable between a first position, at which the magnetic heads and the pinch rollers are all spaced apart from the magnetic tapes accommodated in the respective paired cassette tapes with the reel hubs thereof mounted on the two pairs of reel shafts, and a second position, at which the magnetic heads and the pinch rollers are all in contact with the magnetic tapes accommodated in the paired cassette tapes; and a power transmitting means for selectively transmitting rotational power from the rotational power generating means to the two capstans and the two pairs of reel shafts.

2. The magnetic recording tape driving apparatus according to claim 1, wherein the power transmitting means includes:

a movable gear for receiving the rotational power from the output shaft of the rotational power generating means through a gear means and movable between a first position and a second position in correspondence to the directions of rotation of the output shaft;

a movement blocking member provided on the orbit of movement of the movable gears between the first and second positions and movable between a first position, at which the movable gear is held at either the first position or the second position to prevent movement of the movable gear between the first and second positions, and a second position, spaced apart from the orbit of movement of the movable gear between the first and second positions to permit movement of the movable gear between the first and second positions;

a driving member for moving the movement blocking member to the first position in response to the movement of the head base plate to the first position and for moving the movement blocking member to the second position in response to the movement of the head base plate to the second position;

a first gear train for meshing with the movable gear located at the first position thereof to transmit rotational power to one or another reel shaft of one pair of the two pairs of reel shafts and also to one of the two capstans corresponding to the one pair of reel shafts according to the direction of rotation of the output shaft of the rotational power generating means, thereby causing rotation of the one of the one pair of reel shafts in one direction and also causing rotation of the one capstan in one direction with the rotation of the output shaft in one direction while causing rotation of the another of the one pair of reel shafts in the other direction and also causing rotation of the another capstan in the other direction with the rotation of the output shaft in the other direction; and a second gear train for meshing with the movable gear located at the second position thereof to transmit rotational power to one or another reel shaft of another pair of the two pairs of reel shafts and also to another one of the two capstans corresponding to the another pair of reel shafts according to the direction of rotation of the output shaft of the rotational power generating means, thereby causing rotation of the one of the another pair of reel shafts in one direction and also causing rotation of the another capstan in one direction with the rotation of the output shaft in one direction while causing rotation of the another of the another pair of reel shafts in the other direction and also causing rotation of the another capstan in the other direction with the rotation of the output shaft in the other direction.

3. The magnetic recording tape driving apparatus according to claim 2, wherein: the head base plate is further movable to a third position which is intermediate between the first and second positions, at which third position the magnetic heads are all in contact with the magnetic recording tapes accommodated in the paired cassette tapes while the pinch rollers are all spaced apart from the magnetic recording tapes; and the driving member locates the movement blocking member at the first position in response to the movement of the head base plate to the third position.

4. A magnetic recording tape driving apparatus according to claim 1, wherein the head base plate is movable to a third position located between the first and second positions, at which third position, all of the magnetic heads are brought into contact with the magnetic recording tapes accommodated in the paired tape cassettes and all of the pinch rollers are separated from the respective magnetic recording tapes.

* * * * *